US012580813B2

(12) United States Patent
Venugopal et al.

(10) Patent No.: US 12,580,813 B2
(45) Date of Patent: Mar. 17, 2026

(54) SIGNALING AND CONFIGURATION FOR MODEL BASED CHANNEL TRACKING

(71) Applicant: QUALCOMM Incorporated, San Diego, CA (US)

(72) Inventors: Kiran Venugopal, Raritan, NJ (US); Wooseok Nam, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 764 days.

(21) Appl. No.: 17/805,186

(22) Filed: Jun. 2, 2022

(65) Prior Publication Data

US 2023/0396495 A1     Dec. 7, 2023

(51) Int. Cl.
| | |
|---|---|
| *H04L 41/0823* | (2022.01) |
| *H04B 7/06* | (2006.01) |
| *H04L 5/00* | (2006.01) |
| *H04W 24/08* | (2009.01) |
| *H04W 24/10* | (2009.01) |

(52) U.S. Cl.
CPC ....... *H04L 41/0823* (2013.01); *H04B 7/0626* (2013.01); *H04L 5/0048* (2013.01); *H04W 24/08* (2013.01); *H04W 24/10* (2013.01)

(58) Field of Classification Search
CPC . H04B 7/0626; H04L 5/0048; H04L 41/0823; H04W 24/08; H04W 24/10
See application file for complete search history.

(56) References Cited

U.S. PATENT DOCUMENTS

| | | | | |
|---|---|---|---|---|
| 12,206,611 | B2 * | 1/2025 | Venugopal | .......... H04W 64/006 |
| 12,261,653 | B2 * | 3/2025 | Venugopal | ............ H04W 72/20 |
| 2018/0034525 | A1 * | 2/2018 | Park | ...................... H04B 7/0456 |
| 2020/0092737 | A1 * | 3/2020 | Siomina | ................ H04W 4/025 |
| 2020/0280961 | A1 * | 9/2020 | Lee | ........................... H04W 4/40 |
| 2021/0120572 | A1 * | 4/2021 | Chen | ...................... H04W 72/53 |
| 2021/0195579 | A1 * | 6/2021 | Lei | ........................ H04W 72/51 |
| 2021/0227496 | A1 * | 7/2021 | Ly | .......................... H04W 68/02 |
| 2021/0321442 | A1 * | 10/2021 | Jung | ................. H04W 72/0446 |
| 2022/0021495 | A1 * | 1/2022 | Zhang | ................... H04L 5/0053 |
| 2022/0060989 | A1 * | 2/2022 | Yang | ...................... H04W 72/23 |

* cited by examiner

*Primary Examiner* — Thomas R Cairns
*Assistant Examiner* — Kai Chang
(74) *Attorney, Agent, or Firm* — Procopio, Cory, Hargreaves & Savitch LLP

(57) ABSTRACT

A first device, such as a UE, receives from a second device, such as a network node, a model configuration indicative of a model condition of a wireless channel between the UE and the network node. The UE receives an indication of a channel tracking rate for tracking a variation in the wireless channel relative to the model configuration for the wireless channel and measures, at a timing based on a measurement rate indicated in the model configuration, a reference signal from the network node to measure a condition of the wireless channel between the UE and the network node. The UE tracks the variation in the wireless channel relative to the model configuration based on the channel tracking rate indicated to the UE.

30 Claims, 13 Drawing Sheets

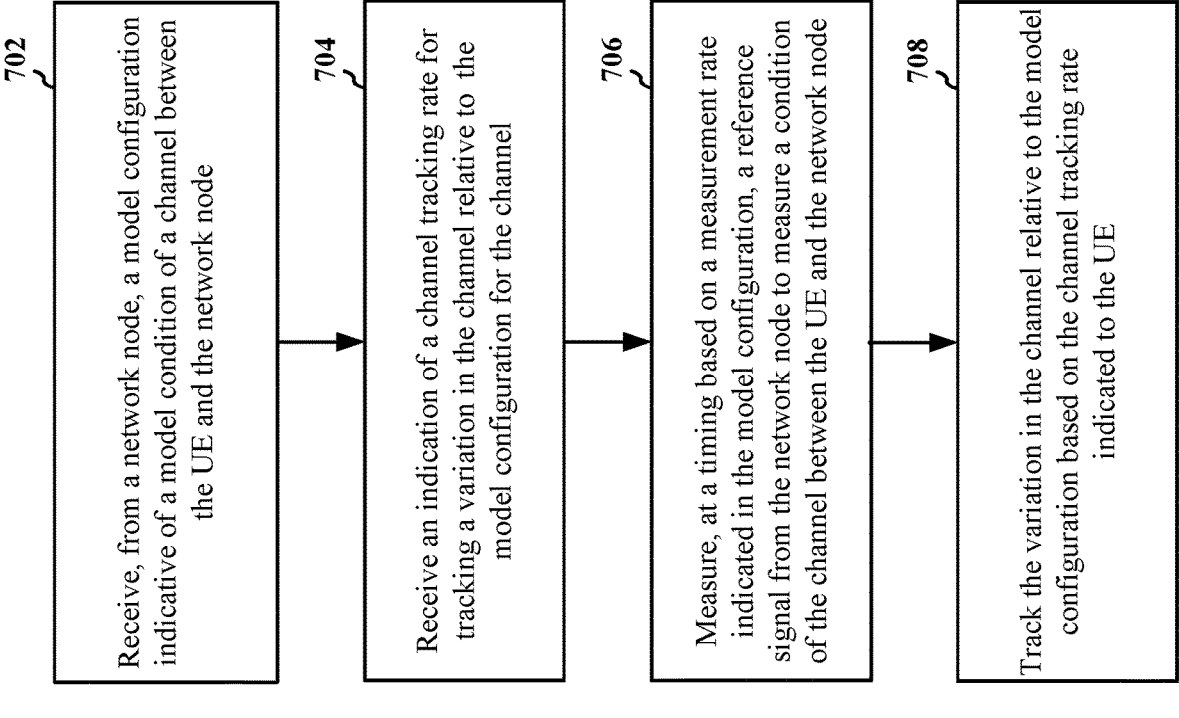

700

702

Receive, from a network node, a model configuration indicative of a model condition of a channel between the UE and the network node

704

Receive an indication of a channel tracking rate for tracking a variation in the channel relative to the model configuration for the channel

706

Measure, at a timing based on a measurement rate indicated in the model configuration, a reference signal from the network node to measure a condition of the channel between the UE and the network node

708

Track the variation in the channel relative to the model configuration based on the channel tracking rate indicated to the UE

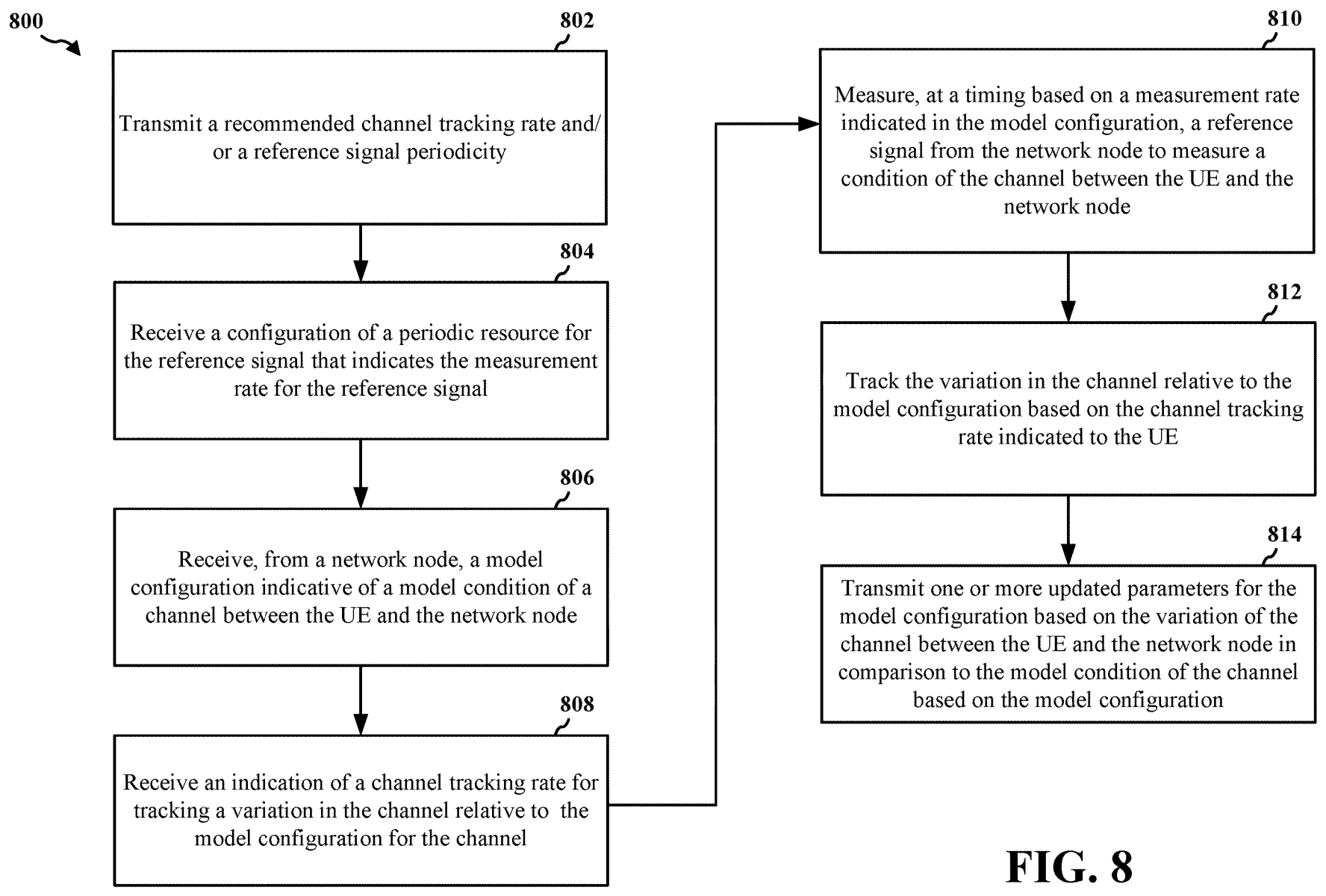

Transmit a recommended channel tracking rate and/ or a reference signal periodicity

804

Receive a configuration of a periodic resource for the reference signal that indicates the measurement rate for the reference signal

806

Receive, from a network node, a model configuration indicative of a model condition of a channel between the UE and the network node

808

Receive an indication of a channel tracking rate for tracking a variation in the channel relative to the model configuration for the channel

810

Measure, at a timing based on a measurement rate indicated in the model configuration, a reference signal from the network node to measure a condition of the channel between the UE and the network node

812

Track the variation in the channel relative to the model configuration based on the channel tracking rate indicated to the UE

814

Transmit one or more updated parameters for the model configuration based on the variation of the channel between the UE and the network node in comparison to the model condition of the channel based on the model configuration

FIG. 8

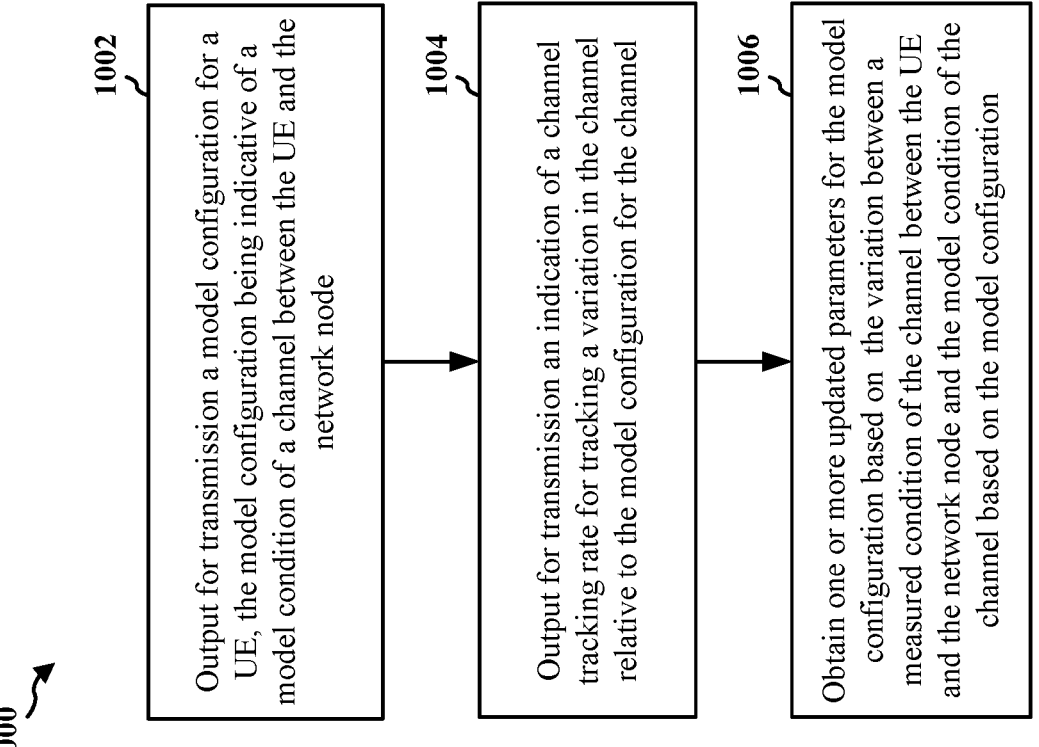

1000

1002

Output for transmission a model configuration for a UE, the model configuration being indicative of a model condition of a channel between the UE and the network node

1004

Output for transmission an indication of a channel tracking rate for tracking a variation in the channel relative to the model configuration for the channel

1006

Obtain one or more updated parameters for the model configuration based on the variation between a measured condition of the channel between the UE and the network node and the model condition of the channel based on the model configuration

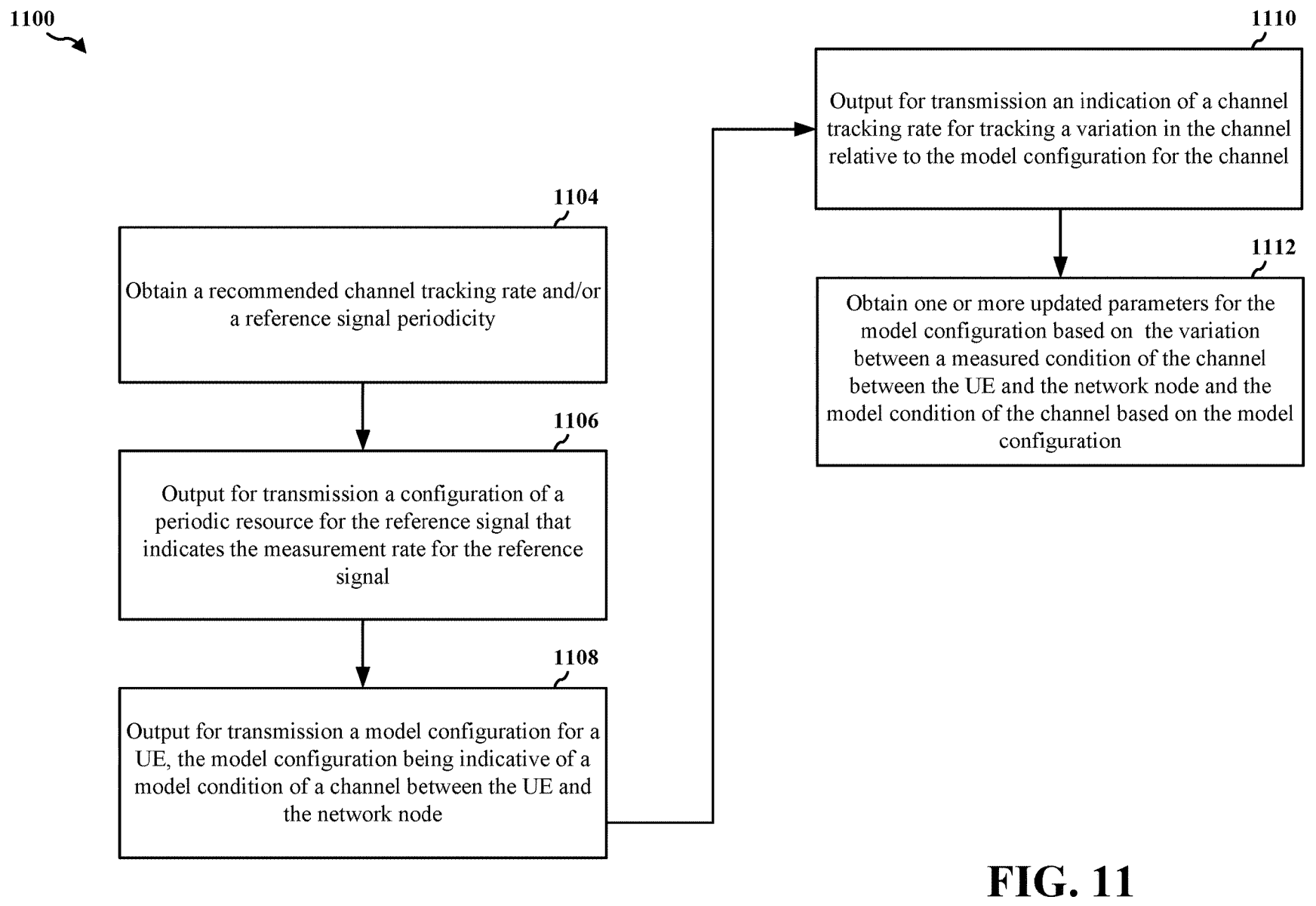

1104 Obtain a recommended channel tracking rate and/or a reference signal periodicity 1106 Output for transmission a configuration of a periodic resource for the reference signal that indicates the measurement rate for the reference signal 1108 Output for transmission a model configuration for a UE, the model configuration being indicative of a model condition of a channel between the UE and the network node 1110 Output for transmission an indication of a channel tracking rate for tracking a variation in the channel relative to the model configuration for the channel 1112 Obtain one or more updated parameters for the model configuration based on the variation between a measured condition of the channel between the UE and the network node and the model condition of the channel based on the model configuration

FIG. 11

SIGNALING AND CONFIGURATION FOR MODEL BASED CHANNEL TRACKING

TECHNICAL FIELD

The present disclosure relates generally to communication systems, and more particularly, to wireless communication including model based channel tracking.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first device. The apparatus receives from a network node, a model configuration indicative of a model condition of a wireless channel between the first device and the second device. The apparatus receives an indication of a channel tracking rate for tracking a variation in the wireless channel relative to the model configuration for the wireless channel and measures, at a timing based on a measurement rate indicated in the model configuration, a reference signal from the network node to measure a condition of the wireless channel between the first device and the second device. The apparatus tracks the variation in the wireless channel relative to the model configuration based on the channel tracking rate indicated to the first device. In some aspects, the first device may be a user equipment (UE), and the second device may be a network node. In some aspects, the first device may be a first UE, and the second device may be a second UE. In some aspects, the first device may be a first network node, and the second device may be a second network node.

In an aspect of the disclosure, a method, a computer-readable medium, and an apparatus are provided for wireless communication at a second device. The apparatus outputs for transmission a model configuration for a first device, the model configuration being indicative of a model condition of a wireless channel between the first device and the second device and outputs for transmission an indication of a channel tracking rate for tracking a variation in the wireless channel relative to the model configuration for the wireless channel. The second device obtains one or more updated parameters for the model configuration based on the variation between a measured condition of the wireless channel between the first device and the second device and the model condition of the wireless channel based on the model configuration. In some aspects, the first device may be a user equipment (UE), and the second device may be a network node. In some aspects, the first device may be a first UE, and the second device may be a second UE. In some aspects, the first device may be a first network node, and the second device may be a second network node.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a flowchart of a method of wireless communication at a UE, in accordance with various aspects of the present disclosure.

FIG. 8 is a flowchart of a method of wireless communication at a UE, in accordance with various aspects of the present disclosure.

FIG. 10 is a flowchart of a method of wireless communication at a network entity, in accordance with various aspects of the present disclosure.

FIG. 11 is a flowchart of a method of wireless communication at a network entity, in accordance with various aspects of the present disclosure.

DETAILED DESCRIPTION

Figure 1:
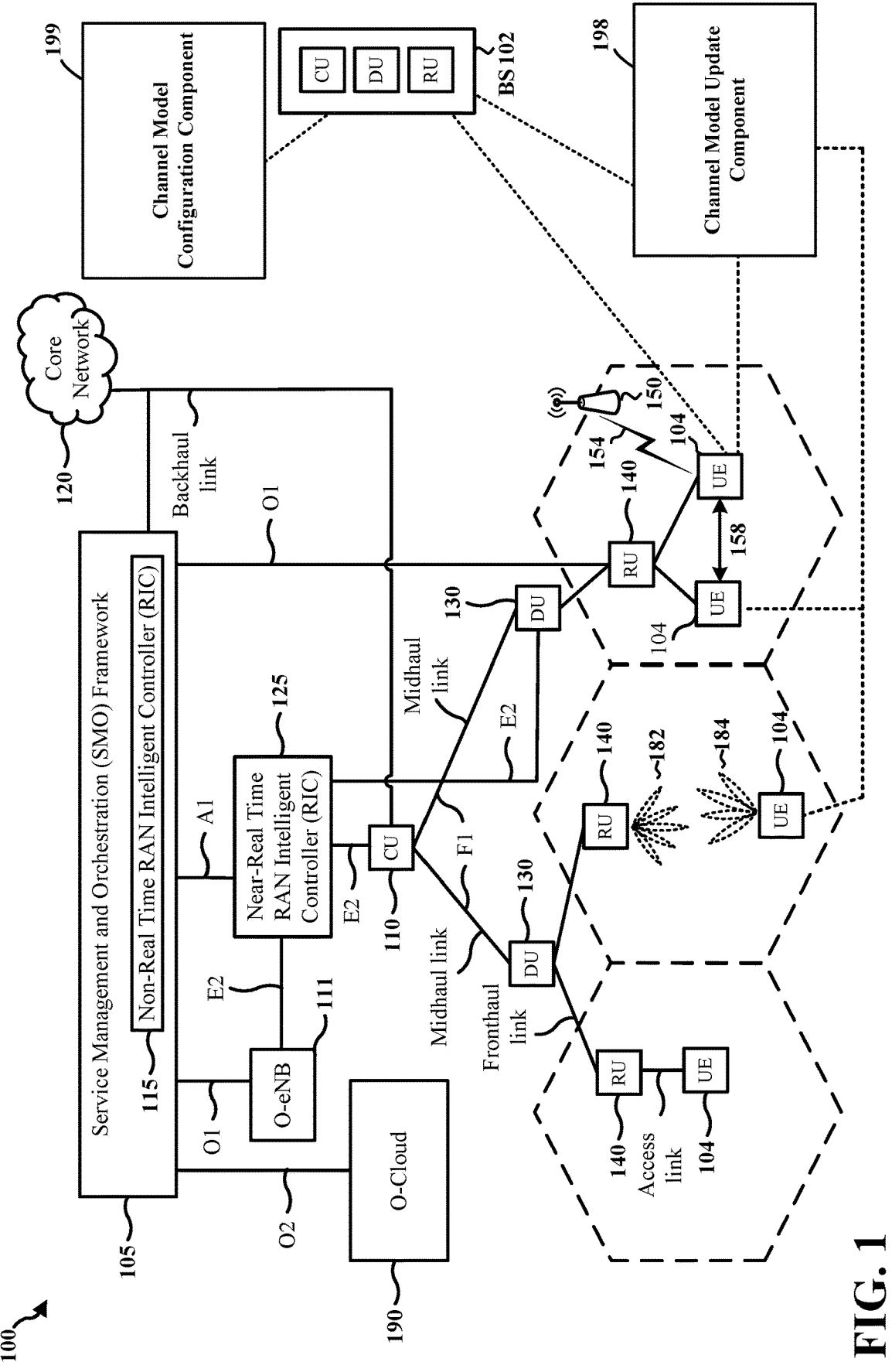
FIG. 1 is a diagram illustrating an example of a wireless communications system and an access network, in accordance with various aspects of the present disclosure.

The measurement and reporting of channel state information (CSI) may be used to adjust and improve communication, such as communication between a UE and network. In some aspects, such as high mobility situations, performance loss may occur based on channel variations that may occur more frequently than CSI updates. Although the CSI reporting rate can be increased, the increased uplink and downlink CSI overhead may reduce system throughput. Additionally, more frequent measurements, transmissions (e.g., of reference signals), and/or reporting uses additional battery power at a UE. As an example, a UE may transmit SRS to enable uplink based measurements. Aspects presented herein provide for model based CSI tracking that may address channel variations while also conserving wireless resources and avoiding additional CSI overhead. Aspects presented herein provide capability signaling between a UE and a network node to assist in a configuration of the UE to perform the channel model tracking and model based channel reporting.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a channel model update component 198 configured to receive from a network node, a model configuration indicative of a model condition of a channel between the UE and the network node and to receive an indication of a channel tracking rate for tracking a variation in the channel relative to the model configuration for the channel. The channel model update component 198 may be configured to measure, at a timing based on a measurement rate indicated in the model configuration, a reference signal from the network node to measure a condition of the channel between the UE and the network node and to track the variation in the channel relative to the model configuration based on the channel tracking rate indicated to the UE. Although aspects are described for a UE and a network node, in some aspects, a UE may receive the model channel configuration from another UE and an indication of the channel tracking rate. The UE may then measure, at a timing based on a measurement rate indicated in the model configuration, a reference signal from the UE, such as a sidelink reference signal, to measure a condition of the channel between the UEs. FIG. 1 also illustrates, that in some aspects, a base station, or other network node may include a channel model update component 198 configured to receive from a network node, a model configuration indicative of a model condition of a channel with a network node or with a UE and to receive an indication of a channel tracking rate for tracking a variation in the channel relative to the model configuration for the other channel. The channel model update component 198 may be configured to measure, at a timing based on a measurement rate indicated in the model configuration, a reference signal from the network node to measure a condition of the channel and to track the variation in the channel relative to the model configuration based on the indicated channel tracking rate In some aspects, a base station 102 or a component of a base station 102, such as a CU 110, a DU 130, and/or an RU 140, may include a channel model configuration component 199 that is configured to output for transmission a model configuration for a UE 104 (or for a second network node), the model configuration being indicative of a model condition of a channel between the UE 104 and the base station 102 (or between network nodes) and to output for transmission an indication of a channel tracking rate for tracking a variation in the channel relative to the model configuration for the channel. The channel model configuration component 199 may be further configured to obtain one or more updated parameters for the model configuration based on the variation between a measured condition of the channel between the UE and the network node (or between the network nodes) and the model condition of the channel based on the model configuration. In some aspects, a UE 104 may include a channel model configuration component 199 that is configured to output for transmission a model configuration for a second UE 104, the model configuration being indicative of a model condition of a channel between the UEs 104, e.g., such as e.g., for sidelink communication, and to output for transmission an indication of a channel tracking rate for tracking a variation in the channel relative to the model configuration for the channel. The channel model configuration component 199 may be further configured to obtain one or more updated parameters for the model configuration based on the variation between a measured condition of the channel between the UEs and the model condition of the channel based on the model configuration.

Although the following description may be focused on 5G NR, the concepts described herein may be applicable to other similar areas, such as LTE, LTE-A, CDMA, GSM, and other wireless technologies.

Figures 2A, 2B, 2C, 2D:
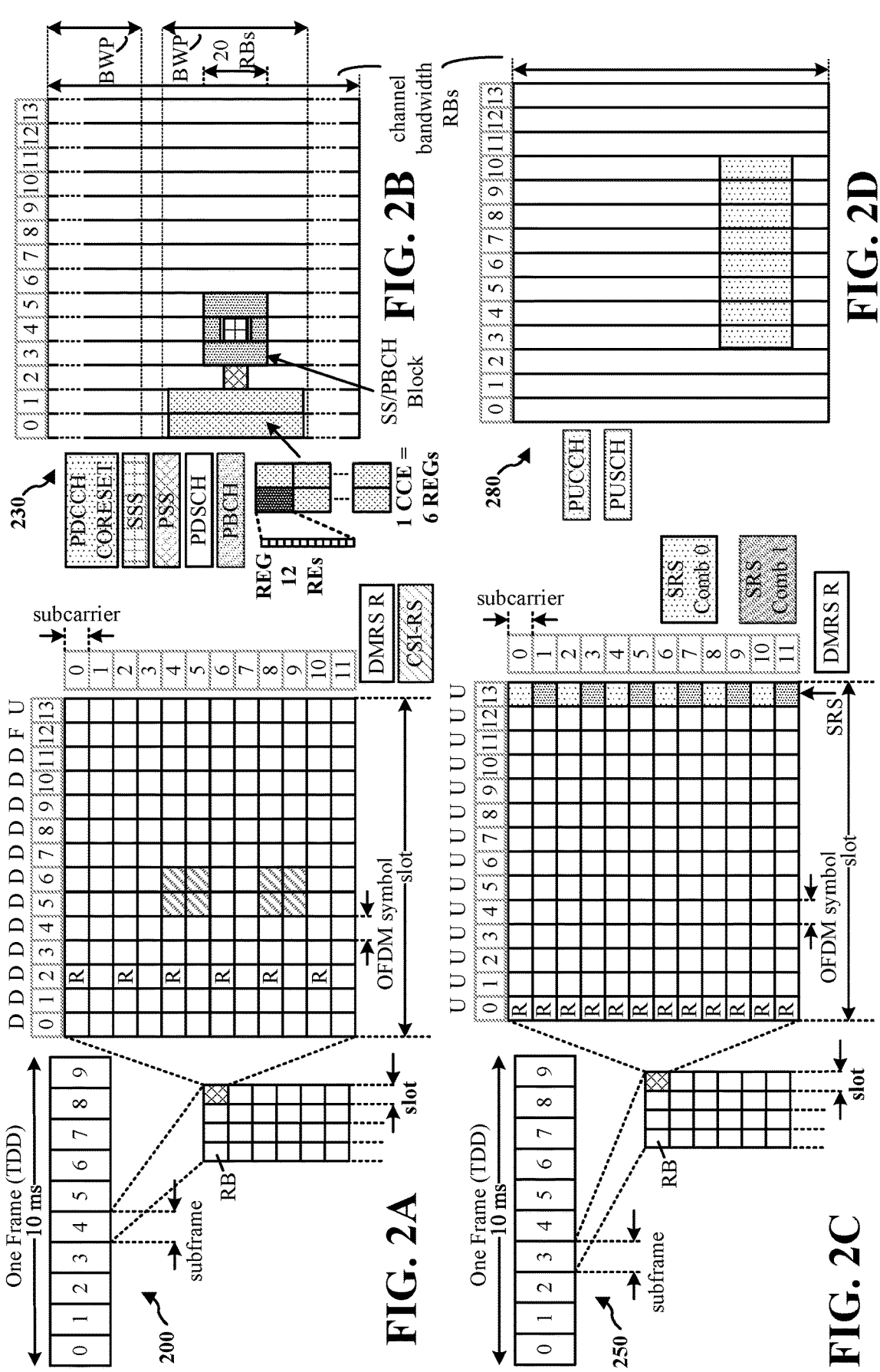
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[KHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
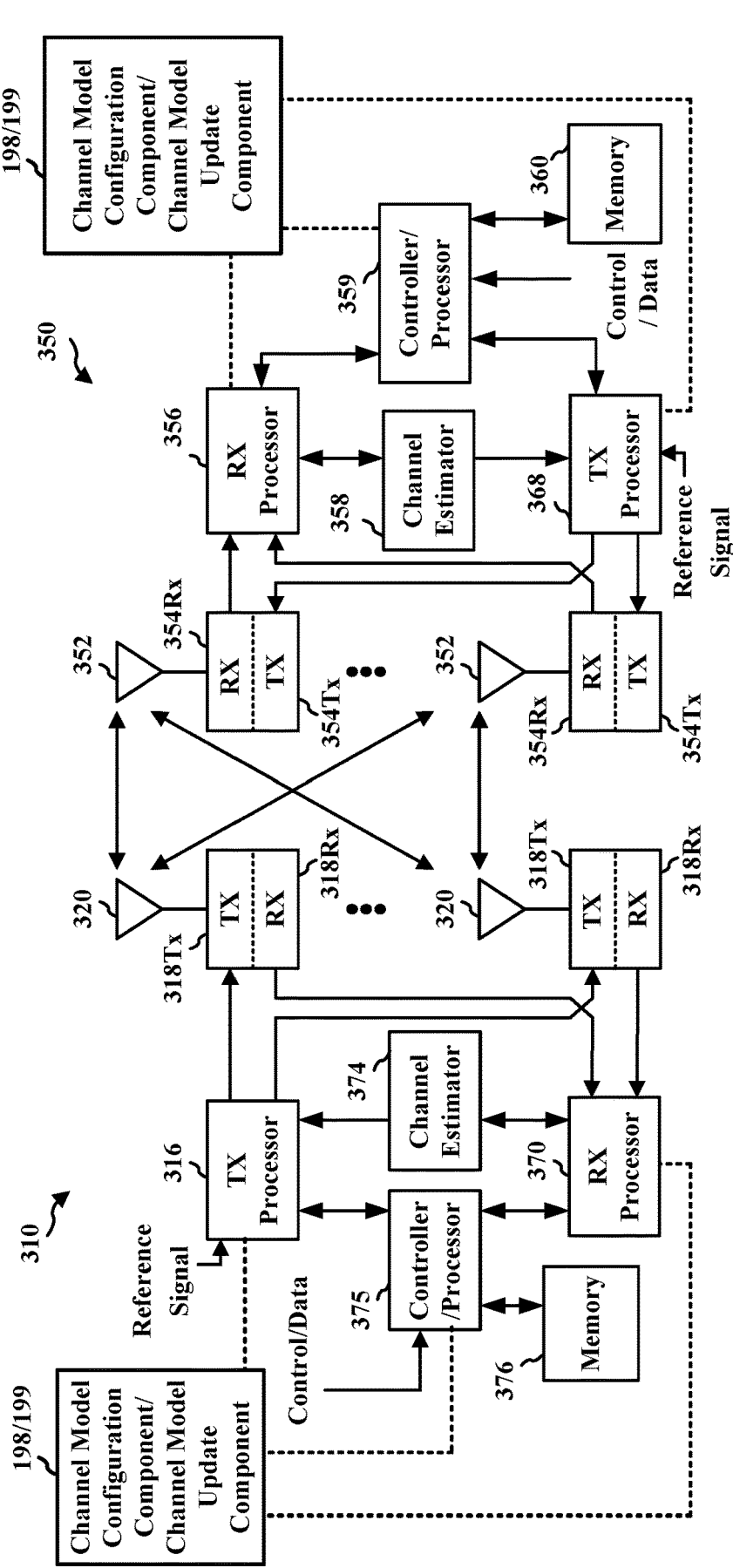
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the channel model update component 198 and/or a channel model configuration component 199 of FIG. 1.

At least one of the TX processor 316, the RX processor 370, and the controller/processor 375 may be configured to perform aspects in connection with the channel model configuration component 199 and/or a channel model update component 198 of FIG. 1.

The measurement and reporting of CSI may be used to adjust and improve communication, such as communication between a UE and network. In some aspects, such as high mobility situations, performance loss may occur based on channel variations that may occur more frequently than CSI updates. Although the CSI reporting rate can be increased, the increased uplink and downlink CSI overhead may reduce system throughput. Additionally, more frequent measurements, transmissions (e.g., of reference signals), and/or reporting uses additional battery power at a UE. As an example, a UE may transmit SRS to enable uplink based measurements. Aspects presented herein provide for model based CSI tracking that may address channel variations while also conserving wireless resources and avoiding additional CSI overhead.

Reducing an overhead associated with channel state information (CSI) measurement and CSI reporting may increase a performance of a first network entity, such as a UE, and/or a second network entity, such as a base station or a component of a base station. For example, reducing a number of CSI measurements may increase a system throughput between the first network entity and the second network entity. However, reducing the number of CSI measurements may also reduce a quality of the CSI, as more CSI measurements may provide increased measurement accuracy, but may also increase the overhead. A reduction of the overhead may be advantageous for high mobility use cases, such as for UEs moving at speeds of 30-500 kilometers per hour (kmph), applications associated with Industrial IoT (IIoT) procedures, automotive applications, highway applications, high-speed train applications, etc.

Some Type II CSI feedback procedures may experience a performance loss even at moderate speeds of the UE, such as 10-30 kmph. Performance loss may occur based on a channel variation being too fast for a CSI measurement/update rate (i.e., a frequency at which the CSI measurement and CSI reporting is performed by the UE). By a time that the UE performs the CSI measurement and reports the CSI measurement to the scheduling entity (e.g., second network entity), the CSI report may become outdated. Thus, subsequent transmissions or pre-coding procedures that are based on the CSI measurement and the CSI report may not be accurate. For example, a mismatch may occur between the indicated CSI measurement and the actual channel conditions through which a signal may be propagated. Type II/enhanced TypeII (eType II) procedures for tracking the CSI feedback may also include increased CSI processing times in comparison to Type-I single panel (SP) CSI feedback procedures.

The CSI measurement/update rate may be increased based on a channel variation rate. As an example, a UE may be requested to report the CSI feedback to the network more frequently for tracking an increased variability of the channel. A request for tracking the increased variability of the channel may also be transmitted in the reverse direction. Such requests may generate an increased downlink/uplink resource overhead that may decrease the system throughput. More frequent reporting occasions may also increase a battery power consumption at the UE. Aspects presented herein help to improve CSI feedback and tracking procedures with less associated overhead.

Figure 4:
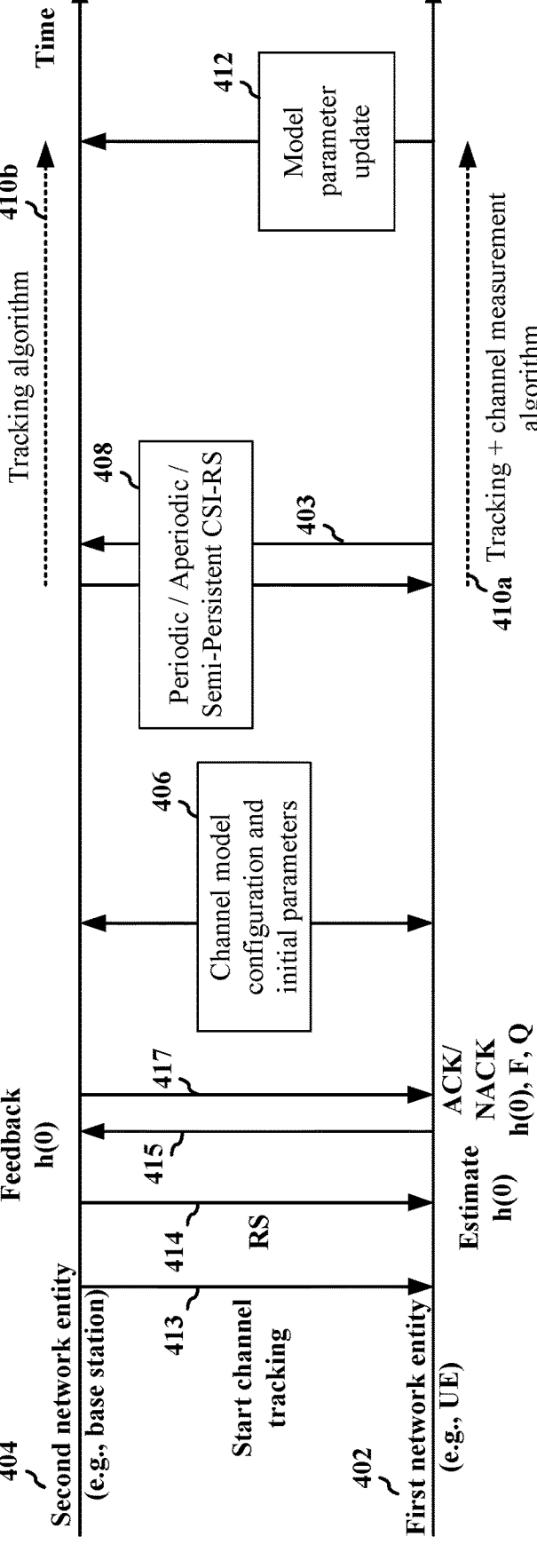
FIG. 4 is a call flow diagram illustrating a model-based channel compression technique, in accordance with various aspects of the present disclosure.

FIG. 4 is a call flow diagram 400 illustrating a model-based channel representation to more efficiently track channel variation between a first network entity 402 (e.g., a UE) and a second network entity 404 (e.g., a base station) with less overhead. While the channel may be modeled in some cases as a time-varying wideband channel, a model-based representation of the channel may also be configured to track the channel variation with reduced overhead. In some aspects, the model may be updated periodically at the Tx node (e.g., second network entity 404) and the Rx node (e.g., first network entity 402), such that a same model may be used to predict a future CSI without performing a corresponding measurement. For instance, the model may be based on a state-space channel profile where each state may correspond to a sparse representation of the channel in a multi-dimensional space. Procedures associated with the model-based representation of the channel may be similar to a delta CSI update for tracking the channel for CSI feedback, but may be further compressed based on the model configuration communicated, at 406, between the second network entity 404 and the first network entity 402.

The first network entity 402 and the second network entity 404, such as a UE and a base station, may exchange common model information during an initial setup procedure for tracking the channel. For example, at 406, the second network entity 404 (e.g., base station) may transmit/receive a channel model configuration and initial parameters to/from the first network entity 402 (e.g., UE). The channel model configuration may be used by the first network entity 402 and the second network entity 404 to ensure that both nodes are using a same model to predict the CSI.

The first network entity 402 may measure the channel based on a reference signal, e.g., 408, received from the second network entity 404. The reference signal and corresponding measurement may occur before or after the channel model configuration and initial parameters are communicated, at 406, between the second network entity 404 and the first network entity 402. The reference signal may correspond to periodic CSI-RS, aperiodic CSI-RS, or semi-persistent CSI-RS. In an example, the first network entity 402 may receive, at 408, the periodic/aperiodic/semi-persistent CSI-RS for measuring the channel after reception/transmission, at 406, of the channel model configuration and initial parameters.

Based on receiving the periodic/aperiodic/semi-persistent CSI-RS from the second network entity 404, the first network entity 402 may execute, at 410*a*, a channel tracking and channel measurement algorithm. The second network entity 404 may likewise execute, at 410*b*, a channel tracking algorithm after transmission, at 508, of the periodic/aperiodic/semi-persistent CSI-RS to the first network entity 402. Based on a channel measurement by the first network entity 402 indicative of a change in a condition of the channel, the first network entity 402 may transmit, at 412, a model parameter update to the second network entity 504 via a CSI feedback procedure. For example, a state-space model including complex and/or vector weights, a measured noise variance, etc., may be signaled, at 412, from the first network entity 402 to the second network entity 404. Each of the nodes (e.g., UE and base station) may be configured to further track the state-space variation. In some implementations, the nodes may determine a mapping between the physical channel and a state vector, and/or a relation between PMI/RI/LI/CQI and the state vector. The mapping/relationship may be incorporated in an exchange of common model information between the nodes.

Each of the nodes may be configured to update/track the channel variation/state-space variation based on one or more filtering operations for the state-space model. For example, one of the nodes may execute an adaptive CSI update algorithm, such as a Kalman filtering algorithm, to track the channel variation, where the update may be transmitted to the other node based on a measurement performed by a measuring node. A CSI report of model parameters (e.g., at 412) may include a Kalman gain update, an indication of non-measuring node updates for the model/channel information, etc. The update, at 412, may be performed by a measuring entity (e.g., the first network entity 402) using a compressed CSI report in which the report may include the model parameter updates for the non-measuring entity (e.g., second network entity 404) to update the model information.

When a state change occurs (e.g., due to a mobility change), the first network entity 402 (e.g., UE) may sparsely update the model parameter to reduce signaling/resource overhead while also ensuring reliable and efficient tracking of the channel variation. In examples, the first network entity 402 may reset a tracking session to ensure that both network entities are tracking the channel variation based on a same state-space model. When an update occurs, at 412, based on a measurement by the first network entity 402 or when a change to the physical channel is detected, a compressed CSI report may be transmitted, at 412, to the second network entity 404 or the tracking session may be reset at the first network entity 402. Such techniques may reduce the signaling overhead and increase the throughput of the system. Accordingly, a model-based representation of the channel may provide both an overhead reduction and more efficient tracking of the channel via a decreased amount of CSI feedback and measurements by the first network entity 402.

Model-based channel compression techniques may be based on the first network entity 402 performing a channel measurement and transmitting, at 412, the compressed CSI feedback report to the second network entity 404. However, model-based channel compression may also be performed for uplink and/or sidelink communications. For instance, the first network entity 402 may indicate the channel model configuration and initial parameters in the reverse direction to the second network entity 404, which may track the channel based on the state-space model for the channel model configuration associated with the communication link between the first network entity 402 and the second network entity 404. Channel measurements by the second network entity 404 may be based on an uplink reference signal, such as SRS, such that the second network entity 404 may transmit model parameter updates in the reverse direction to the first network entity 402.

After an initial setup procedure between the first network entity 402 and the second network entity 404, a reference signal for channel measurement, such as the periodic/aperiodic/semi-persistent CSI-RS or SRS, may be communicated between the nodes. Feedback may be transmitted from the measuring node to the non-measuring node, such that both nodes may determine an initial state of the system. One node may transmit the feedback to the other node in some cases before receiving the model configuration from the other node. For example, CSI feedback may correspond to transmissions of CSI-RS and CSI feedback that are also used for non-model based tracking (e.g., which may be referred to as legacy CSI-RS transmissions/feedback), which may be used by the second network entity 404 to configure the model and the initial parameters transmitted to the first network entity 402.

Both nodes may track the channel variation based on the state-space model. If the first network entity 402 is the node that is performing the channel measurement, the first network entity 402 may provide the update, at 412, in addition to the channel tracking, at 410a, to recommend a state-space change to the second network entity 404. That is, the measuring node may perform both the tracking procedure and the channel measurement for updating, at 412, the model parameters.

The first network entity 402 may indicate a delta change to the second network entity 404 via compressed CSI feedback, which may be used for updating the state-space model at the second network entity 404. Channel tracking procedures may be respectively executed at both nodes, at 410a-410b, but when a measurement and update occur at one of the nodes, the measurement and update may be indicated to the other node via a feedback procedure. Frequent CSI transmissions and reporting, signaling overhead, and power consumption may be reduced via model-based channel compression techniques. Likewise, uplink reference signals may be used to perform the procedure in the reverse direction where the second network entity 404 may update the model/states and signal the updated model/states to the first network entity 402.

In some aspects, as shown at 415, the first network entity 402 may provide initial feedback, such as initial CSI, for the channel. In some aspects, the second network entity 404 may send an indication 413 to the first network entity to start channel tracking. The second network entity 404 may transmit a reference signal 414 such as a periodic CSI-RS, a semi-persistent CSI-RS, an aperiodic CSI-RS, or another reference signal. The first network entity 402 may measure the reference signal to obtain an initial assessment, or measurement of the channel, e.g., h(0). The first network entity 402 may transmit feedback 415 to the second network entity based on the measurement of the CSI-RS. The feedback 415 may indicate the estimation of the channel h(0). In some aspects, the second network entity 404 may indicate an ACK or a NACK for the channel, e.g., h(0), indicated by the first network entity 402. The response from the network, at 417 may include one or more model parameters, e.g., F and/or Q, in addition to an ACK/NACK for h(0). For example, before the channel model configuration and initial parameters are communicated, at 406, the first network entity 402 may send feedback 401, which the second network entity 404 may use to determine the channel model configuration and/or initial parameters to send to the first network entity. Additionally, or alternatively, the first network entity 402 may send initial feedback 503 that assists the first network entity 402 and/or the second network entity 404 in tracking the channel at 410a or 410b.

Figure 5:
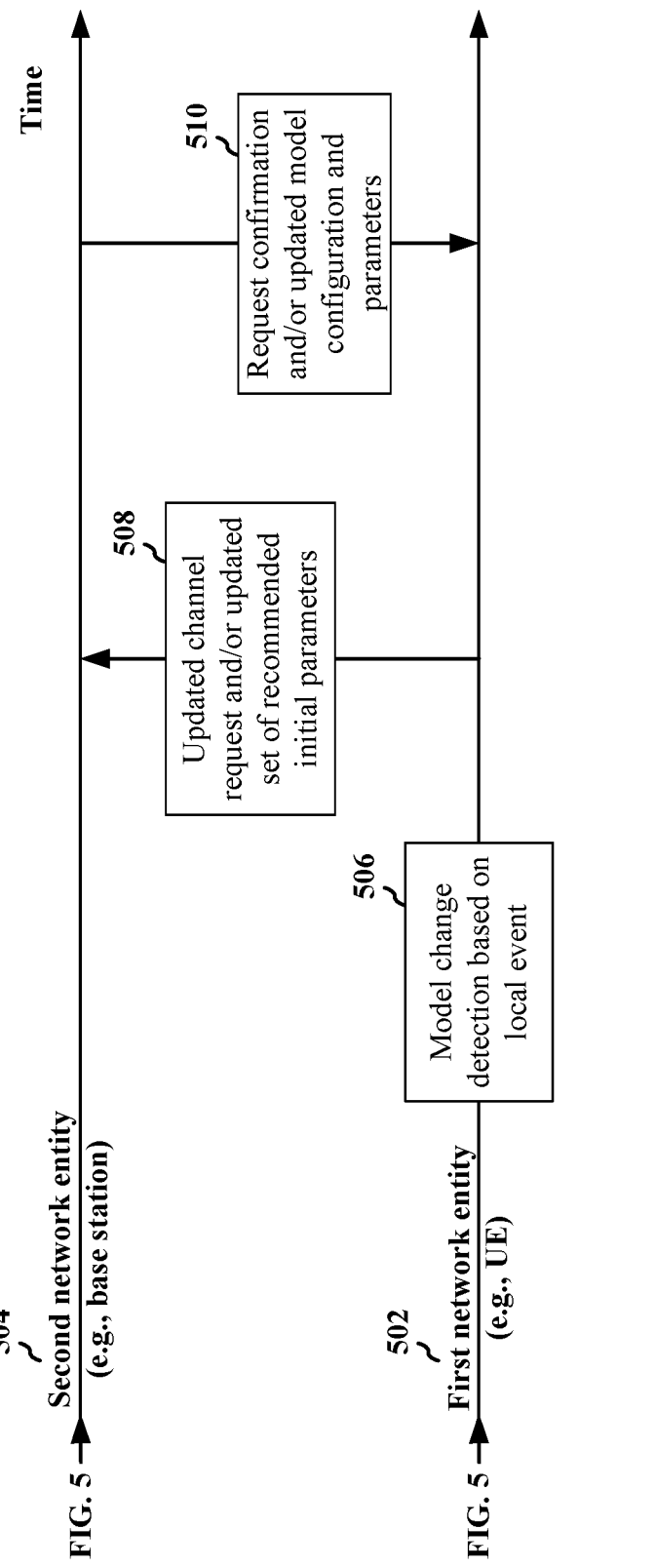
FIG. 5 is a call flow diagram illustrating a model-based channel compression technique, in accordance with various aspects of the present disclosure.

FIG. 5 is a call flow diagram 500 illustrating a model-based channel compression technique. At 506, a first network entity 502 (e.g., UE) may detect a model change based on a local event at the first network entity 502. The local event may include a mobility change of the first network entity 502, a change in channel conditions (e.g., noise, interference, blockage), or a change of the physical device (e.g., battery life, power usage, device heating, etc.).

After the first network entity 502 detects, at 506, a change to the model/states, the first network entity 502 may trigger, at a second network entity 504 (e.g., base station), a switch of the channel or an update to the model. For example, the first network entity 502 may transmit, at 508, a request for an updated channel and/or an updated set of recommended initial parameters. In cases where the first network entity 502 performs the measurement, the first network entity 502 may switch a Tx/Rx configuration based on detected changes to the mobility of the first network entity 502, channel conditions, device conditions, etc. The switch of the Tx/Rx configuration may impact parameters of the channel model configuration.

If the first network entity 502 detects, at 506, a model change based on a local event at the first network entity 502, the first network entity 502 may indicate to the second network entity 504 that the nodes may no longer use a current channel model configuration. For example, the first network entity 502 may transmit (e.g., in a PUSCH) the request, at 508, for the updated channel and/or the updated set of recommended initial parameters. Based on a report from the first network entity 502, the second network entity 504 may respond/transmit, at 510, to the first network entity 502 with a confirmation message to the request and/or an updated channel model configuration and parameters.

Since both nodes may be tracking the channel based on a common model, whenever a change is detected by one of the nodes, the detecting node may indicate the change to the other node (e.g., non-detection node). In some examples, a different beam pair may be used for communications between the first network entity 502 and the second network entity 504. If a different beam is used by one of the nodes to perform the communication, the different beam may have different properties based on the channel parameters. For instance, the different beam may have a different delay spread, Doppler spread, etc. The parameters may be beam-specific. Hence, if a different tracking procedure is to be performed for the different beam or the different CSI-RS resource, or if the number of ports or the rank associated with the transmission has changed, a new tracking session may have to be initiated.

The channel model may be in a discrete time domain, with a sampling duration as an adjustable parameter. For example, the sampling duration may be one of the parameters indicated to the first network entity (e.g., such as a UE) by the second network entity (e.g., such as a base station) as part of or in connection with a model configuration.

An example state-space channel model may correspond to $h(n)=Fh(n-1)+w(n)$, and an example observation model may correspond to $z(n)=h(n)+v(n)$, where $h(n)$ corresponds to the channel at time n, F corresponds to a state transition matrix, $w(n)$ corresponds to process noise, which may be modeled as a circular symmetric complex Gaussian random variable denoted by $CN(0, Q)$, where CN is indicative of a complex normal distribution, and $v(n)$ corresponds to a measurement noise, which may be modeled as a circular symmetric complex Gaussian random variable denoted by $CN(0, R)$. F, Q, and R may correspond to portions of the model configuration that are commonly known, or otherwise agreed, among the nodes. The state-space model may be indicative of the channel to be measured, whereas the state transition matrix may represent part of the model configuration between the first network entity 502 and the second network entity 504. At each observation instance, the nodes may apply the transition matrix to a previous observation to determine a current state. At least one of the nodes may measure the channel, which may include the state. The measurement process may be noisy in some cases. Thus, covariance in the system may be associated with unknown variables.

An estimate of the channel at a time n, e.g., h(n) given observations until z(n−1) may be indicated as $\hat{h}(n|n-1)$, where:

$$\hat{h}(n|n-1)=F\hat{h}(n-1|n-1)$$

with a covariance matrix for time n given n−1 being $P_{n|n-1}=FP_{n-1|n-1}F^H+Q$.

In some examples, rather than reporting a differential channel state (e.g., based on Δh(n)=h(n)−h(n−1)), a model-based update (e.g., based on $K_n y(n)$, where $K_n$ corresponds to a Kalman gain/filter coefficient at time n, and y(n) corresponds to a signal at time n based on the observation model and the state-space model) may be reported from the first network entity 602 to the second network entity 604. The same state-space model and Kalman filtering procedure may be used at both nodes to predict a future channel corresponding to $\hat{h}(n+k|n)$. Instead of applying the state-space model to determine the channel h(n), similar state-space models may also be applied to other channel state feedback (CSF) metrics, such as CQI, PMI, etc., to determine channel information. The Kalman filtering procedure may be represented as:

$$y(n)=z(n)-\hat{h}(n|n-1)$$

$$S_n=P_{n|n-1}+R$$

$$K_n=P_{n|n-1}S_n^{-1}$$

$$\hat{h}(n|n)=\hat{h}(n|n-1)+K_n y(n)$$

$$P_{n|n}=(I-K_n)P_{n|n-1}$$

Where $S_n$ represents the covariance of y(n).

Irrespective of an observation (e.g., a CSI transmission or measurement), both network entities (for example, a UE and a base station) and UE can track h using the state transition model using $\hat{h}(n|n-1)=F\hat{h}(n-1|n-1)$.

When an observation is available at a time instance n, the measuring entity, e.g., the first network entity 502, can provide the (Kalman) update. A sampling duration may be the same as the CSI-RS periodicity, in which case tracking may be based on measurement of the CSI-RS. In other aspects, the tracking or sampling duration may be different than the CSI-RS periodicity. When an observation is not available at an instance n, the estimate may be indicated as:

$$\hat{h}(n|n):=\hat{h}(n|n-1)$$

$$P_{n|n}:=P_{n|n-1}$$

As an example, when an observation is 0, it may be treated as a missed observation. In some aspects, the time stamp of updating the model for the channel may be decoupled from the measurement of the channel, and the tracking rate and the channel measurement rate may be signaled between the network entities, e.g., between the UE and the base station. As an example, when a tracking periodicity is to be faster than a CSI-RS periodicity, then the tracking can still work by treating instances as missing observation, e.g., z(n)=0.

Figure 6:
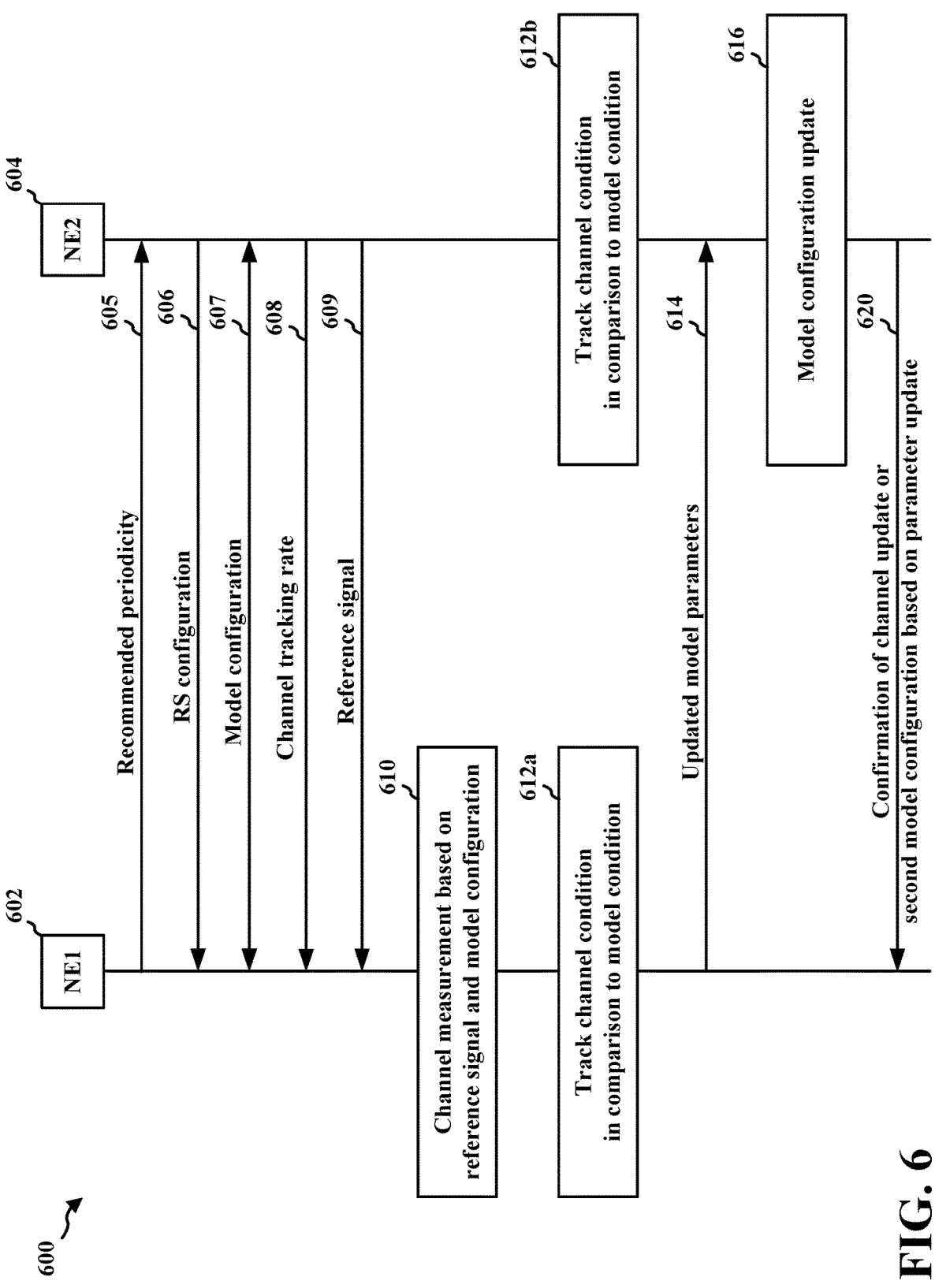
FIG. 6 is a call flow diagram illustrating communications between a first network entity and a second network entity, in accordance with various aspects of the present disclosure.

FIG. 6 illustrates an example communication flow between a first network entity 602 and a second network entity 604. In some aspects, the first network entity 602 may be a UE and the second network entity 604 may be a base station or a component of a base station. As described in connection with FIG. 4 and/or FIG. 5, the first network entity 602 may exchange model configuration information 607 with a second network entity 604. For example, the first network entity 602 may receive the one or more model configuration parameters from the second network entity 604 for a channel model.

As illustrated at 608, the first network entity 602 may receive an indication of a channel tracking rate from the second network entity 604. In some aspects, the channel tracking rate may be signaled as part of the model parameter configuration, e.g., at 607. The channel tracking rate indicates to the first network entity 602 the timing, e.g., how frequently, to update and/or track the model based channel.

The first network entity 602 may also receive a configuration for a reference signal, at 606 for use in measuring and/or updating a channel state. As an example, the configuration may be for a periodic CSI-RS resource configured for the first network entity 602 to measure and update the channel state. In some aspects, the reference signal resource may have a same periodicity as the channel tracking rate. In other aspects, the reference signal resource may have a different periodicity than the channel tracking rate. In some aspects, the reference signal resource may be for a CSI resource, e.g., such as a CSI for non-model based channel tracking (e.g., which may be referred to as a legacy configuration for the CSI resource). In some aspects, the reference signal configuration may be signaled as a part of the model configuration, e.g., at 607, in terms of a periodicity (or a change) of the measurement resource, e.g., either explicitly or implicitly, as a function of the channel tracking periodicity. In some aspects, the reference signal resource may be configured based on a MAC-CE/DCI based dynamic signaling of the measurement resource periodicity (or a change in the periodicity). In some aspects, a MAC-CE and/or DCI update may indicate a change in the periodicity for both the tracking rate and the measurement rate of the reference signal.

In some aspects, the first network entity 602 may indicate a recommended value, or values, for channel tracking periodicity and/or CSI-RS periodicity, as shown at 605. In some aspects, the first network entity 602 may indicate a recommended value, or values, for a change to the channel tracking periodicity and/or a change to the CSI-RS periodicity. The recommendation may also come at a different point in time that the illustration in FIG. 6. As an example, the recommendation may occur after reception of the model configuration, at 607 and/or after the channel tracking at 612a. In some aspects, the recommendation may be transmitted based on local information at the first network entity 602 and/or based on a layer 1 (L1) event. Examples of a L1 event that may trigger the network entity 602 to transmit a recommendation of a channel tracking periodicity and/or a CSI-RS periodicity may include a change in a mobility pattern (e.g., detected based on one or more local sensors), a change in a battery level, an activation or deactivation of an antenna module, an activation or a deactivation of an antenna panel, a traffic pattern for an application such as a web browsing application or a streaming application, or a change in traffic for such an application.

Based on the received information, the first network entity 602 may measure the reference signal 609, at 610, The first network entity 602 may track the channel condition in comparison to a model channel condition, at 612*a*. The second network entity 604 may similarly track the channel condition based on a model condition, at 612*b*.

As illustrated at 614, a new report quantity may be signaled to indicate model-based compressed delta CSI feedback, e.g., as described in connection with 412 in FIG. 4. For example, the first network entity 602 may indicate a model parameter update based on a measured variation relative to the model for the channel. The first network entity 602 may signal the report quantity in CSI resources, e.g., in a CSI resource that may be used for model parameter updates and/or non-model based CSI (which may be referred to as a legacy CSI). The first network entity 602 may signal the report in a resource configured as a part of the model configuration, e.g., which may be separate than resources associated with non-model based CSI. The first network entity 602 may signal the report in a MAC-CE or based on resources scheduled with a DCI.

The second network entity 604 may update the model configuration, at 616, based on the updated model parameters received at 614. In some aspects, the second network entity 604 may transmit a confirmation of the update, and/or a second model configuration or one or more updated model parameters to the first network entity 602, at 620.

FIG. 7 is a flowchart 700 of a method of wireless communication at a first device. In some aspects, the first device may be a user equipment (UE), and the second device may be a network node. In some aspects, the first device may be a first UE, and the second device may be a second UE. In some aspects, the first device may be a first network node, and the second device may be a second network node. As an example, in some aspects, the method may be performed by a UE (e.g., the UE 104, 350; first network entity 402, 502, 602; the apparatus 904). In some aspects, the method may be performed by a network node, such as a base station or a component of a base station. For example, the method may improve coordination between a UE and a network node for channel tracking based on a model configuration for the channel. As another example, the method may improve coordination between UEs for channel tracking based on a model configuration for the channel. As another example, the method may improve coordination between network nodes for channel tracking based on a model configuration for the channel.

At 702, the first device receives, from a second device, a model configuration indicative of a model condition of a wireless channel between the first device and the second device. In some aspects, the second device may be a network node. In some aspects, the second device may be a UE. The reception may be performed, e.g., by the channel model update component 198. Aspects of model configuration are described in connection with FIGS. 4, 5, and 6.

At 704, the first device receives an indication of a channel tracking rate for tracking a variation in the wireless channel relative to the model configuration for the wireless channel. The reception may be performed, e.g., by the channel model update component 198. For example, there may be a time frame or periodicity at which the state space keeps evolving for a channel, and there may be another periodicity at which reference signals are measured and then used to update the model. The indication of the channel tracking rate may be in the model configuration. The indication of the channel tracking rate may be in at least one of a MAC-CE or DCI indicating a measurement resource periodicity. In some aspects, the channel tracking rate associated with the model configuration may be indicated relative to a reference signal resource configuration for the reference signal in additional to a reference signal measurement rate. In some aspects, the periodicity may be signaled relative to a reference periodicity. For example, the reference periodicity may be a particular CSI-RS, with respect to which the periodicity of the channel tracking rate is indicated. For example, the channel tracking rate may be 1 of every two instances of the reference signal periodicity. The reference signal resource configuration may be for a CSI resource. In addition to a CSI resource, the reference signal may be a reference signal for uplink channel tracking, e.g., such as an SRS, a sidelink channel tracking, or channel tracking between other network nodes.

At 706, the first device measures, at a timing based on a measurement rate indicated in the model configuration, a reference signal from the second device to measure a condition of the wireless channel between the first device and the second device. The measuring may be based on an observation model, with a corresponding timing either being the same or being different than the channel tracking rate. The measurement may be performed, e.g., by the channel model update component 198. Measurement of a channel condition is described in connection with FIGS. 4, 5, and 6.

At 708, the first device tracks the variation in the wireless channel relative to the model configuration based on the channel tracking rate indicated to the first device. The tracking may be performed, e.g., by the channel model update component 198. The tracking of a variation of a channel relative to a model configuration is described in connection with FIGS. 4, 5, and 604.

FIG. 8 is a flowchart 800 of a method of wireless communication at a first device. In some aspects, the first device may be a user equipment (UE), and the second device may be a network node. In some aspects, the first device may be a first UE, and the second device may be a second UE. In some aspects, the first device may be a first network node, and the second device may be a second network node. As an example, in some aspects, the method may be performed by a UE (e.g., the UE 104, 350; first network entity 402, 502, 602; the apparatus 904). In some aspects, the method may be performed by a network node, such as a base station or a component of a base station. For example, the method may improve coordination between a UE and a network node for channel tracking based on a model configuration for the channel. As another example, the method may improve coordination between UEs for channel tracking based on a model configuration for the channel. As another example, the method may improve coordination between network nodes for channel tracking based on a model configuration for the channel.

At 806, the first device receives, from a second device, a model configuration indicative of a model condition of a wireless channel between the first device and the second device. The reception may be performed, e.g., by the channel model update component 198. Aspects of model configuration are described in connection with FIGS. 4, 5, and 6.

At 808, the first device receives an indication of a channel tracking rate for tracking a variation in the wireless channel relative to the model configuration for the wireless channel. The reception may be performed, e.g., by the channel model update component 198. For example, there may be a time frame or periodicity at which the state space keeps evolving for a channel, and there may be another periodicity at which reference signals are measured and then used to update the model. The indication of the channel tracking rate may be in the model configuration. The indication of the channel tracking rate may be in at least one of a MAC-CE or DCI indicating a measurement resource periodicity. In some aspects, the channel tracking rate associated with the model configuration may be indicated relative to a reference signal resource configuration for the reference signal in additional to a reference signal measurement rate. In some aspects, the periodicity may be signaled relative to a reference periodicity. For example, the reference periodicity may be a particular CSI-RS, with respect to which the periodicity of the channel tracking rate is indicated. For example, the channel tracking rate may be 1 of every two instances of the reference signal periodicity. The reference signal resource configuration may be for a CSI resource. In addition to a CSI resource, the reference signal may be a reference signal for uplink channel tracking, e.g., such as an SRS, a sidelink channel tracking, or channel tracking between other network nodes.

At 810, the first device measures, at a timing based on a measurement rate indicated in the model configuration, a reference signal from the second device to measure a condition of the wireless channel between the first device and the second device. The measuring may be based on an observation mode, with a corresponding timing either be the same or being different than the channel tracking rate. The measurement may be performed, e.g., by the channel model update component 198. Measurement of a channel condition is described in connection with FIGS. 4, 5, and 6.

At 812, the first device tracks the variation in the channel relative to the model configuration based on the channel tracking rate indicated to the first device. The tracking may be performed, e.g., by the channel model update component 198. The tracking of a variation of a channel relative to a model configuration is described in connection with FIGS. 4, 5, and 6.

In some aspects, at 804, the first device may receive a configuration of a periodic resource for the reference signal that indicates the measurement rate for the reference signal, wherein a periodicity of the periodic resource for the reference signal is different than the channel tracking rate indicated in the model configuration. The reception may be performed, e.g., by the channel model update component 198.

In some aspects, at 804, the first device may receive a configuration of a periodic resource for the reference signal that indicates the measurement rate for the reference signal, wherein the periodic resource for the reference signal has a same periodicity as the channel tracking rate indicated in the model configuration. The reception may be performed, e.g., by the channel model update component 198.

As illustrated at 802, the first device may transmit at least one of a recommended channel tracking rate or a reference signal periodicity. The transmission may be performed, e.g., by the channel model update component 198. The at least one of the recommended channel tracking rate or the reference signal periodicity is transmitted in response to local information at the first device or an occurrence of an L1 event. FIG. 6 illustrates an example of a first network entity 602 transmitting a recommendation, at 605.

As illustrated at 814, the first device may transmit, to the second device, one or more updated parameters for the model configuration based on the variation of the wireless channel between the first device and the second device in comparison to the model condition of the wireless channel based on the model configuration. The transmission may be performed, e.g., by the channel model update component 198. The one or more updated parameters may include a compressed delta CSI feedback based on the model configuration.

Figure 9:
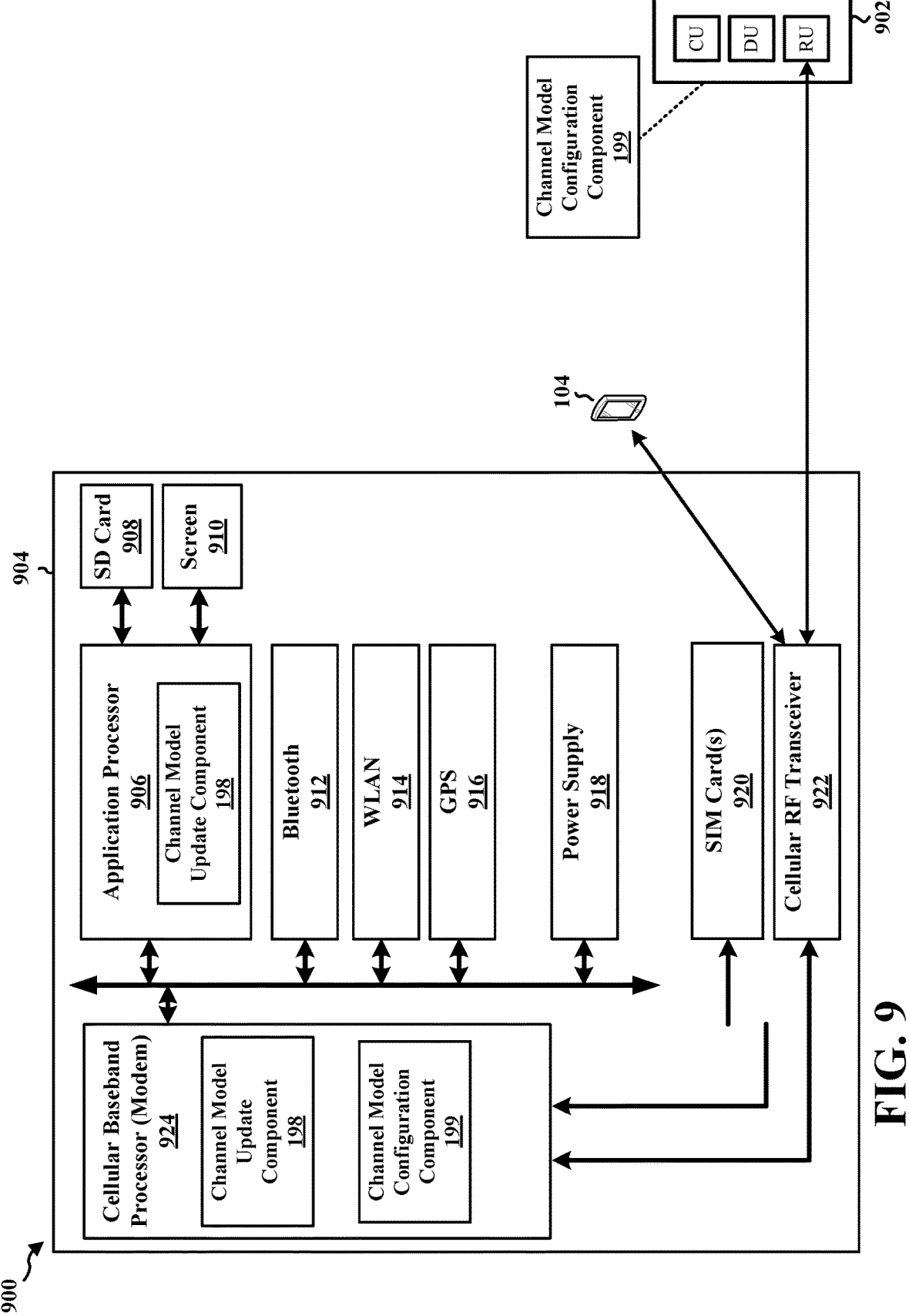
FIG. 9 is a diagram illustrating an example of a hardware implementation for an example apparatus and/or network entity, in accordance with various aspects of the present disclosure.

FIG. 9 is a diagram 900 illustrating an example of a hardware implementation for an apparatus 904. The apparatus 904 may be the first device that is configured to perform the aspects described in connection with FIGS. 7 and/or 8. In some aspects, the apparatus 904 may be the second device that is configured to perform the aspects described in connection with FIGS. 10 and/or 11. The apparatus may be a UE, a component of a UE, or may implement UE functionality. In some aspects, the apparatus 904 may include a cellular baseband processor 924 (also referred to as a modem) coupled to one or more transceivers 922 (e.g., cellular RF transceiver). The cellular baseband processor 924 may include on-chip memory 924'. In some aspects, the apparatus 904 may further include one or more subscriber identity modules (SIM) cards 920 and an application processor 906 coupled to a secure digital (SD) card 908 and a screen 910. The application processor 906 may include on-chip memory 906'. In some aspects, the apparatus 904 may further include a Bluetooth module 912, a WLAN module 914, an SPS module 916 (e.g., GNSS module), one or more sensor modules 918 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SO-NAR), magnetometer, audio and/or other technologies used for positioning), additional memory modules 926, a power supply 930, and/or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas and/or utilize the antennas 980 for communication. The cellular baseband processor 924 communicates through the transceiver(s) 922 via one or more antennas 980 with the UE 104 and/or with an RU associated with a network entity 902. The cellular baseband processor 924 and the application processor 906 may each include a computer-readable medium/memory 924', 906', respectively. The additional memory modules 926 may also be considered a computer-readable medium/memory. Each computer-readable medium/memory 924', 906', 926 may be non-transitory. The cellular baseband processor 924 and the application processor 906 are each responsible for general processing, including the execution of software stored on the computer-readable medium/memory. The software, when executed by the cellular baseband processor 924/application processor 906, causes the cellular baseband processor 924/application processor 906 to perform the various functions described supra. The computer-readable medium/memory may also be used for storing data that is manipulated by the cellular baseband processor 924/application processor 906 when executing software. The cellular baseband processor 924/application processor 906 may be a component of the UE 350 and may include the memory 360 and/or at least one of the TX processor 368, the RX processor 356, and the controller/processor 359. In one configuration, the apparatus 904 may be a processor chip (modem and/or application) and include just the cellular baseband processor 924 and/or the application processor 906, and in another configuration, the apparatus 904 may be the entire UE (e.g., see 350 of FIG. 3) and include the additional modules of the apparatus 904.

As discussed supra, the component 198 is configured to receive from a second device, a model configuration indicative of a model condition of a wireless channel between the first device and the second device; receive an indication of a channel tracking rate for tracking a variation in the wireless channel relative to the model configuration for the wireless channel; measure, at a timing based on a measurement rate indicated in the model configuration, a reference signal from the second device to measure a condition of the wireless channel between the first device and the second device; and track the variation in the wireless channel relative to the model configuration based on the channel tracking rate indicated to the first device. The channel model update component 198 may be further configured to receive a configuration of a periodic resource for the reference signal that indicates the measurement rate for the reference signal, wherein a periodicity of the periodic resource for the reference signal is different than the channel tracking rate indicated in the model configuration. The channel model update component 198 may be further configured to receive a configuration of a periodic resource for the reference signal that indicates the measurement rate for the reference signal, wherein the periodic resource for the reference signal has a same periodicity as the channel tracking rate indicated in the model configuration. The channel model update component 198 may be further configured to transmit at least one of a recommended channel tracking rate or a reference signal periodicity. The channel model update component 198 may be further configured to transmit, to the second device, one or more updated parameters for the model configuration based on the variation of the wireless channel between the first device and the second device in comparison to the model condition of the wireless channel based on the model configuration. The component 198 may be within the cellular baseband processor 924, the application processor 906, or both the cellular baseband processor 924 and the application processor 906. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 904 may include a variety of components configured for various functions. In one configuration, the apparatus 904, and in particular the cellular baseband processor 924 and/or the application processor 906, includes means for receiving from a second device, a model configuration indicative of a model condition of a channel between the first device and the second device; means for receiving an indication of a channel tracking rate for tracking a variation in the wireless channel relative to the model configuration for the wireless channel; means for measuring, at a timing based on a measurement rate indicated in the model configuration, a reference signal from the second device to measure a condition of the wireless channel between the first device and the second device; and means for tracking the variation in the wireless channel relative to the model configuration based on the channel tracking rate indicated to the first device. The apparatus 904 may further include means for receiving a configuration of a periodic resource for the reference signal that indicates the measurement rate for the reference signal, wherein a periodicity of the periodic resource for the reference signal is different than the channel tracking rate indicated in the model configuration. The apparatus 904 may further include means for receiving a configuration of a periodic resource for the reference signal that indicates the measurement rate for the reference signal, wherein the periodic resource for the reference signal has a same periodicity as the channel tracking rate indicated in the model configuration. The apparatus 904 may further include means for transmitting at least one of a recommended channel tracking rate or a reference signal periodicity. The apparatus 904 may further include means for transmitting, to the second device, one or more updated parameters for the model configuration based on the variation of the wireless channel between the first device and the second device in comparison to the model condition of the wireless channel based on the model configuration. The apparatus 904 may include means to perform any of the aspects described in connection with the flowcharts in FIGS. 7 and/or 8, and/or the aspects described in connection with the first network entity in FIG. 4, 5, or 6. In some aspects, the apparatus may include a channel model configuration component 199, e.g., as described in connection with FIG. 1 and/or FIG. 3, which may be configured to perform any of the aspects described in connection with the flowcharts in FIGS. 10 and/or 11, and/or the aspects described in connection with the second network entity in FIG. 4, 5, or 6. For example, at times, the apparatus may act as the first network entity. At other times, the device may act as the second network entity. The means may be the component 198 of the apparatus 904 configured to perform the functions recited by the means. As described supra, the apparatus 904 may include the TX processor 368, the RX processor 356, and the controller/processor 359. As such, in one configuration, the means may be the TX processor 368, the RX processor 356, and/or the controller/processor 359 configured to perform the functions recited by the means.

FIG. 10 is a flowchart 1000 of a method of wireless communication at a second device. In some aspects, the method may be performed by a network node such as a base station, a component base station, or another network entity (e.g., the base station 102, 310; the CU 110; the DU 130; the RU 140; the network entity 1202, 1302). In some aspects, the method may be performed by a UE. In some aspects, the first device may be a user equipment (UE), and the second device may be a network node. In some aspects, the first device may be a first UE, and the second device may be a second UE. In some aspects, the first device may be a first network node, and the second device may be a second network node. The method may improve coordination between a UE and a network node for channel tracking based on a model configuration for the channel. The method may improve coordination between UEs for channel tracking based on a model configuration for the channel. The method may improve coordination between network nodes for channel tracking based on a model configuration for the channel.

At 1004, the second device may output for transmission a model configuration for a first device, the model configuration being indicative of a model condition of a wireless channel between the first device and the second device. The output may be performed, e.g., by the channel model configuration component 199. Example aspects of such output are described in connection with FIGS. 4, 5, and 6.

At 1006, the second device may output for transmission an indication of a channel tracking rate for tracking a variation in the wireless channel relative to the model configuration for the wireless channel. The indication of the channel tracking rate may be in the model configuration. The indication of the channel tracking rate may be in at least one of a MAC-CE or DCI indicating a measurement resource periodicity. In some aspects, the channel tracking rate associated with the model configuration may be indicated relative to a reference signal resource configuration for the reference signal in additional to a reference signal measurement rate. In some aspects, the periodicity may be signaled relative to a reference periodicity. For example, the reference periodicity may be a particular CSI-RS, with respect to which the periodicity of the channel tracking rate is indicated. For example, the channel tracking rate may be 1 of every two instances of the reference signal periodicity. The reference signal resource configuration may be for a CSI resource. In addition to a CSI resource, the reference signal may be a reference signal for uplink channel tracking, e.g., such as an SRS, a sidelink channel tracking, or channel tracking between other network nodes. For example, there may be a time frame or periodicity at which the state space keeps evolving for a channel, and there may be another periodicity at which reference signals are measured and then used to update the model. The output may be performed, e.g., by the channel model configuration component 199. Example aspects of such output are described in connection with FIGS. 4, 5, and 6.

At 1006, the second device may obtain one or more updated parameters for the model configuration based on the variation between a measured condition of the wireless channel between the first device and the second device and the model condition of the wireless channel based on the model configuration. The one or more updated parameters may include a compressed delta CSI feedback based on the model configuration. The obtaining may be performed, e.g., by the channel model configuration component 199. The indication of an update to a model configuration is described in connection with FIGS. 4, 5, and 6.

FIG. 11 is a flowchart 1100 of a method of wireless communication at a second device. In some aspects, the method may be performed by a network node such as a base station, a component base station, or another network entity (e.g., the base station 102, 310; the CU 110; the DU 130; the RU 140; the network entity 1202, 1302). In some aspects, the method may be performed by a UE. In some aspects, the first device may be a UE, and the second device may be a network node. In some aspects, the first device may be a first UE, and the second device may be a second UE. In some aspects, the first device may be a first network node, and the second device may be a second network node. The method may improve coordination between a UE and a network node for channel tracking based on a model configuration for the channel. The method may improve coordination between UEs for channel tracking based on a model configuration for the channel. The method may improve coordination between network nodes for channel tracking based on a model configuration for the channel.

At 1108, the second device may output for transmission a model configuration for a first device, the model configuration being indicative of a model condition of a wireless channel between the first device and the second device. The output may be performed, e.g., by the channel model configuration component 199. Example aspects of such output are described in connection with FIGS. 4, 5, and 6.

At 1110, the second device may output for transmission an indication of a channel tracking rate for tracking a variation in the wireless channel relative to the model configuration for the wireless channel. The indication of the channel tracking rate may be in the model configuration. The indication of the channel tracking rate may be in at least one of a MAC-CE or DCI indicating a measurement resource periodicity. In some aspects, the channel tracking rate associated with the model configuration may be indicated relative to a reference signal resource configuration for the reference signal in additional to a reference signal measurement rate. In some aspects, the periodicity may be signaled relative to a reference periodicity. For example, the reference periodicity may be a particular CSI-RS, with respect to which the periodicity of the channel tracking rate is indicated. For example, the channel tracking rate may be 1 of every two instances of the reference signal periodicity. The reference signal resource configuration may be for a CSI resource. In addition to a CSI resource, the reference signal may be a reference signal for uplink channel tracking, e.g., such as an SRS, a sidelink channel tracking, or channel tracking between other network nodes. For example, there may be a time frame or periodicity at which the state space keeps evolving for a channel, and there may be another periodicity at which reference signals are measured and then used to update the model. The output may be performed, e.g., by the channel model configuration component 199. Example aspects of such output are described in connection with FIGS. 4, 5, and 6.

At 1112, the second device may obtain one or more updated parameters for the model configuration based on the variation between a measured condition of the wireless channel between the first device and the second device and the model condition of the wireless channel based on the model configuration. The one or more updated parameters may include a compressed delta CSI feedback based on the model configuration. The obtaining may be performed, e.g., by the channel model configuration component 199. The indication of an update to a model configuration is described in connection with FIGS. 4, 5, and 6.

At 1106, the second device may output for transmission a configuration of a periodic resource for a reference signal to be measured in connection with the model configuration, wherein a periodicity of the periodic resource for the reference signal is different than the channel tracking rate indicated in the model configuration. The output may be performed, e.g., by the channel model configuration component 199.

At 1106, the second device may output for transmission a configuration of a periodic resource for a reference signal to be measured in connection with the model configuration, wherein the periodic resource for the reference signal has a same periodicity as the channel tracking rate indicated in the model configuration. The output may be performed, e.g., by the channel model configuration component 199.

As illustrated at 1104, the second device may obtain at least one of a recommended channel tracking rate or a reference signal periodicity. The obtaining may be performed, e.g., by the channel model configuration component 199. The at least one of the recommended channel tracking rate or the reference signal periodicity is transmitted in response to local information at the first device or an occurrence of an L1 event. FIG. 6 illustrates an example of a first network entity 602 transmitting a recommendation, at 605.

Figure 12:
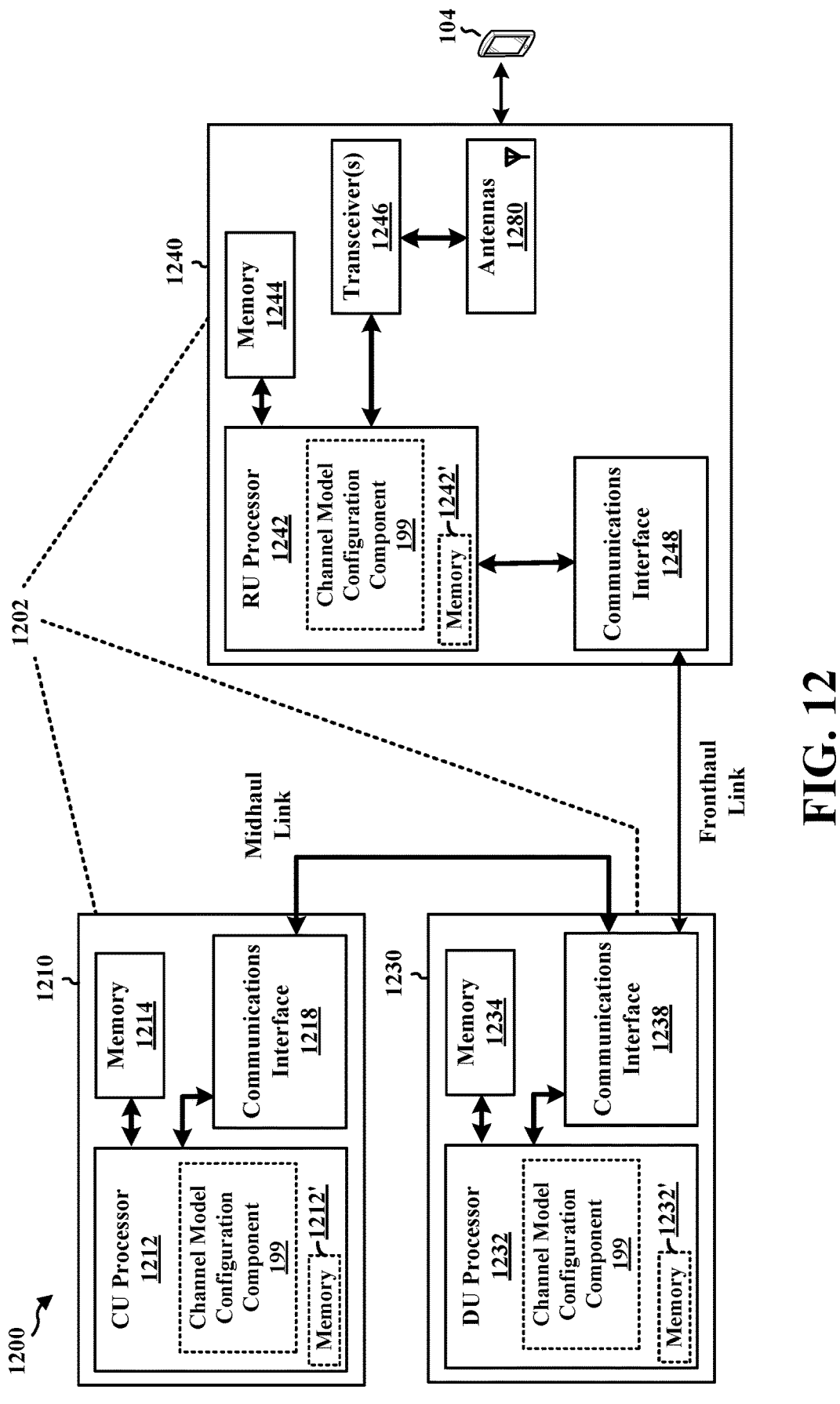
FIG. 12 is a diagram illustrating an example of a hardware implementation for an example network entity, in accordance with various aspects of the present disclosure.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to output for transmission a model configuration for a first device, the model configuration being indicative of a model condition of a channel between the first device and the network node; output for transmission an indication of a channel tracking rate for tracking a variation in the wireless channel relative to the model configuration for the wireless channel; and obtain one or more updated parameters for the model configuration based on the variation between a measured condition of the wireless channel between the first device and the network node and the model condition of the wireless channel based on the model configuration. The channel model configuration component 199 may be further configured to output for transmission a configuration of a periodic resource for a reference signal to be measured in connection with the model configuration, wherein a periodicity of the periodic resource for the reference signal is different than the channel tracking rate indicated in the model configuration. The channel model configuration component 199 may be further configured to output for transmission a configuration of a periodic resource for a reference signal to be measured in connection with the model configuration, wherein the periodic resource for the reference signal has a same periodicity as the channel tracking rate indicated in the model configuration. The channel model configuration component 199 may be further configured to obtain least one of a recommended channel tracking rate or a reference signal periodicity. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for outputting for transmission a model configuration for a first device, the model configuration being indicative of a model condition of a wireless channel between the first device and the second device; means for outputting for transmission an indication of a channel tracking rate for tracking a variation in the wireless channel relative to the model configuration for the wireless channel; and means for obtaining one or more updated parameters for the model configuration based on the variation between a measured condition of the wireless channel between the first device and the second device and the model condition of the wireless channel based on the model configuration. The network entity 1202 may further include means for outputting for transmission a configuration of a periodic resource for a reference signal to be measured in connection with the model configuration, wherein a periodicity of the periodic resource for the reference signal is different than the channel tracking rate indicated in the model configuration. The network entity 1202 may further include means for outputting for transmission a configuration of a periodic resource for a reference signal to be measured in connection with the model configuration, wherein the periodic resource for the reference signal has a same periodicity as the channel tracking rate indicated in the model configuration. The network entity 1202 may further include means for obtaining at least one of a recommended channel tracking rate or a reference signal periodicity. The network entity 1202 may include means to perform any of the aspects described in connection with FIGS. 10 and/or 11, and/or the aspects described in connection with the second network entity in FIG. 4, 5, or 6. In some aspects, the network entity may further include means to perform any of the aspects described in connection with the flowcharts in FIGS. 7 and/or 8, and/or the aspects described in connection with the first network entity in FIG. 4, 5, or 6. As an example, the network entity 1202 may include a channel model update component 198, e.g., as described in connection with FIG. 1 and/or FIG. 3, which may be configured to perform any of the aspects described in connection with the flowcharts in FIGS. 7 and/or 8, and/or the aspects described in connection with the first network entity in FIG. 4, 5, or 6. For example, at times, the apparatus may act as the first network entity. At other times, the device may act as the second network entity. The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

Figure 13:
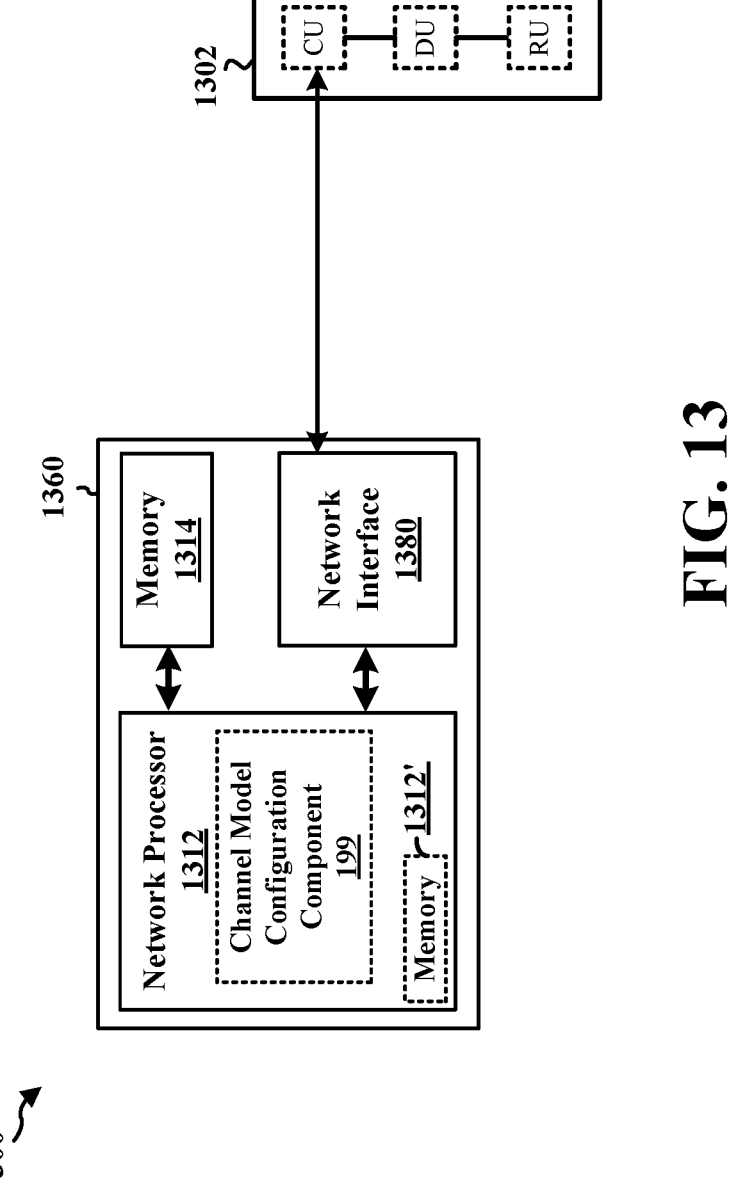
FIG. 13 is a diagram illustrating an example of a hardware implementation for an example network entity, in accordance with various aspects of the present disclosure.

FIG. 13 is a diagram 1300 illustrating an example of a hardware implementation for a network entity 1360. In one example, the network entity 1360 may be within the core network 120. The network entity 1360 may include a network processor 1312. The network processor 1312 may include on-chip memory 1312'. In some aspects, the network entity 1360 may further include additional memory modules 1314. The network entity 1360 communicates via the network interface 1380 directly (e.g., backhaul link) or indirectly (e.g., through a RIC) with the CU. The on-chip memory 1312' and the additional memory modules 1314 may each be considered a computer-readable medium/memory. Each computer-readable medium/memory may be non-transitory. The processor 1312 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the channel model configuration component 199 may be configured to output for transmission a model configuration for a first device, the model configuration being indicative of a model condition of a wireless channel between the first device and the second device; output for transmission an indication of a channel tracking rate for tracking a variation in the wireless channel relative to the model configuration for the wireless channel; and obtain one or more updated parameters for the model configuration based on the variation between a measured condition of the wireless channel between the first device and the second device and the model condition of the wireless channel based on the model configuration. The channel model configuration component 199 may be further configured to output for transmission a configuration of a periodic resource for a reference signal to be measured in connection with the model configuration, wherein a periodicity of the periodic resource for the reference signal is different than the channel tracking rate indicated in the model configuration. The channel model configuration component 199 may be further configured to output for transmission a configuration of a periodic resource for a reference signal to be measured in connection with the model configuration, wherein the periodic resource for the reference signal has a same periodicity as the channel tracking rate indicated in the model configuration. The channel model configuration component 199 may be further configured to obtain least one of a recommended channel tracking rate or a reference signal periodicity. The channel model configuration component 199 may be within the processor 1312. The channel model configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1360 may include a variety of components configured for various functions. In one configuration, the network entity 1360 includes means for outputting for transmission a model configuration for a first device, the model configuration being indicative of a model condition of a channel between the first device and the second device; means for outputting for transmission an indication of a channel tracking rate for tracking a variation in the wireless channel relative to the model configuration for the wireless channel; and means for obtaining one or more updated parameters for the model configuration based on the variation between a measured condition of the wireless channel between the first device and the second device and the model condition of the wireless channel based on the model configuration. The network entity 1302 may further include means for outputting for transmission a configuration of a periodic resource for a reference signal to be measured in connection with the model configuration, wherein a periodicity of the periodic resource for the reference signal is different than the channel tracking rate indicated in the model configuration. The network entity 1302 may further include means for outputting for transmission a configuration of a periodic resource for a reference signal to be measured in connection with the model configuration, wherein the periodic resource for the reference signal has a same periodicity as the channel tracking rate indicated in the model configuration. The network entity 1302 may further include means for obtaining at least one of a recommended channel tracking rate or a reference signal periodicity. The network entity 1302 may include means to perform any of the aspects described in connection with FIGS. 10 and/or 11, and/or the aspects described in connection with the second network entity in FIG. 4, 5, or 6. In some aspects, the network entity may further include means to perform any of the aspects described in connection with the flowcharts in FIGS. 7 and/or 8, and/or the aspects described in connection with the first network entity in FIG. 4, 5, or 6. As an example, the network entity 1302 may include a channel model update component 198, e.g., as described in connection with FIG. 1 and/or FIG. 3, which may be configured to perform any of the aspects described in connection with the flowcharts in FIGS. 7 and/or 8, and/or the aspects described in connection with the first network entity in FIG. 4, 5, or 6. For example, at times, the apparatus may act as the first network entity. At other times, the device may act as the second network entity. The means may be the channel model configuration component 199 of the network entity 1360 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is method of wireless communication at a first device including: receiving from a second device, a model configuration indicative of a model condition of a wireless channel between the first device and the second device; receiving an indication of a channel tracking rate for tracking a variation in the wireless channel relative to the model configuration for the wireless channel; measuring, at a timing based on a measurement rate indicated in the model configuration, a reference signal from the second device to measure a condition of the wireless channel between the first device and the second device; and tracking the variation in the wireless channel relative to the model configuration based on the channel tracking rate indicated to the first device.

In aspect 2, the method of aspect 1 further includes receiving a configuration of a periodic resource for the reference signal that indicates the measurement rate for the reference signal, wherein a periodicity of the periodic resource for the reference signal is different than the channel tracking rate indicated in the model configuration.

In aspect 3, the method of aspect 1 further includes receiving a configuration of a periodic resource for the reference signal that indicates the measurement rate for the reference signal, wherein the periodic resource for the reference signal has a same periodicity as the channel tracking rate indicated in the model configuration.

In aspect 4, the method of any of aspects 1-3 further includes that the channel tracking rate associated with the model configuration is indicated relative to a reference signal resource configuration for the reference signal in additional to a reference signal measurement rate.

In aspect 5, the method of aspect 4 further includes that the reference signal resource configuration is for a CSI resource.

In aspect 6, the method of any of aspects 1-5 further includes that the indication of the channel tracking rate is comprised in the model configuration.

In aspect 7, the method of any of aspects 1-5 further includes that the indication is comprised in at least one of a MAC-CE or DCI indicating a measurement resource periodicity.

In aspect 8, the method of any of aspects 1-7 further includes transmitting at least one of a recommended channel tracking rate or a reference signal periodicity.

In aspect 9, the method of aspect 8 further includes that the at least one of the recommended channel tracking rate or the reference signal periodicity is in response to local information at the first device or an occurrence of an L1 event.

In aspect 10, the method of any of aspects 1-9 further includes transmitting, to the second device, one or more updated parameters for the model configuration based on the variation of the wireless channel between the first device and the second device in comparison to the model condition of the wireless channel based on the model configuration.

In aspect 11, the method of aspect 10 further includes that the one or more updated parameters includes a compressed delta CSI feedback based on the model configuration.

Aspect 12 is an apparatus for wireless communication at a first device, comprising means for performing the method of any of aspects 1-11.

Aspect 13 is an apparatus for wireless communication including a memory; and at least one processor coupled to the memory and, based at least in part on information stored in the memory, the at least one processor is configured to perform the method of any of aspects 1-11.

In aspect 14, the apparatus of aspect 12 or aspect 13 further includes at least one transceiver or at least one antenna.

Aspect 15 is a non-transitory computer-readable medium storing computer executable code, the code when executed by at least one processor causes the at least one processor to implement a method as in any of aspects 1-11.

Aspect 16 is a method of wireless communication at a second device, including: outputting for transmission a model configuration for a first device, the model configuration being indicative of a model condition of a wireless channel between the first device and the second device; outputting for transmission an indication of a channel tracking rate for tracking a variation in the wireless channel relative to the model configuration for the wireless channel; and obtaining one or more updated parameters for the model configuration based on the variation between a measured condition of the wireless channel between the first device and the second device and the model condition of the wireless channel based on the model configuration.

In aspect 17, the method of aspect 16 further includes outputting for transmission a configuration of a periodic resource for a reference signal to be measured in connection with the model configuration, wherein a periodicity of the periodic resource for the reference signal is different than the channel tracking rate indicated in the model configuration.

In aspect 18, the method of aspect 16 further includes outputting for transmission the configuration of the periodic resource for the reference signal to be measured in connection with the model configuration, wherein the periodic resource for the reference signal has a same periodicity as the channel tracking rate indicated in the model configuration.

In aspect 19, the method of any of aspects 16-18 further includes that the channel tracking rate associated with the model configuration is indicated relative to a reference signal resource configuration for a reference signal in additional to a reference signal measurement rate.

In aspect 20, the method of aspect 19 further includes that the reference signal resource configuration is for a CSI resource.

In aspect 21, the method of any of aspects 16-20 further includes that the indication of the channel tracking rate is comprised in the model configuration.

In aspect 22, the method of any of aspects 16-20 further includes that the indication is comprised in at least one of a MAC-CE or DCI indicating a measurement resource periodicity.

In aspect 23, the method of any of aspects 16-22 further includes that obtaining at least one of a recommended channel tracking rate or a reference signal periodicity.

In aspect 24, the method of aspect 23 further includes that the at least one of the recommended channel tracking rate or the reference signal periodicity is transmitted in response to local information at the first device or an occurrence of a L1 event.

In aspect 25, the method of any of aspects 16-24 further includes that the one or more updated parameters includes a compressed delta CSI feedback based on the model configuration.

Aspect 26 is an apparatus for wireless communication at a second device, comprising means for performing the method of any of aspects 16-25.

Aspect 27 is an apparatus for wireless communication including a memory; and at least one processor coupled to the memory and, based at least in part on information stored in the memory, the at least one processor is configured to perform the method of any of aspects 16-25.

In aspect 28, the apparatus of aspect 26 or aspect 27 further includes at least one transceiver or at least one antenna.

Aspect 29 is a non-transitory computer-readable medium storing computer executable code, the code when executed by at least one processor causes the at least one processor to implement a method as in any of aspects 16-25.

What is claimed is:

1. An apparatus for wireless communication at a first device, including:
  memory; and
  at least one processor coupled to the memory and, based at least in part on information stored in the memory, the at least one processor is configured to:
    receive a configuration of a periodic resource for a reference signal for measurement of a wireless channel;
    receive from a second device, a model configuration indicative of a model condition of the wireless channel between the first device and the second device, wherein the model condition indicates a channel state that is modeled based on the model configuration;
    receive an indication of a channel tracking rate for tracking a variation in the wireless channel relative to the model configuration for the wireless channel;
    measure, at a timing based on a measurement rate based on the configuration for the reference signal and the model configuration, the reference signal from the second device to measure a condition of the wireless channel between the first device and the second device; and
    track the variation in the condition measured for the wireless channel relative to the model condition from the model configuration based on the channel tracking rate indicated to the first device.

2. The apparatus of claim 1, wherein the configuration of the periodic resource for the reference signal indicates the measurement rate for the reference signal, and wherein a periodicity of the periodic resource for the reference signal is different than the channel tracking rate indicated in the model configuration.

3. The apparatus of claim 1, wherein the configuration of the periodic resource for the reference signal indicates the measurement rate for the reference signal, and wherein the periodic resource for the reference signal has a same periodicity as the channel tracking rate indicated in the model configuration.

4. The apparatus of claim 1, wherein the channel tracking rate associated with the model configuration is indicated relative to a reference signal resource configuration for the reference signal in additional to a reference signal measurement rate.

5. The apparatus of claim 4, wherein the reference signal resource configuration is for a channel state information (CSI) resource.

6. The apparatus of claim 1, wherein the indication of the channel tracking rate is comprised in the model configuration.

7. The apparatus of claim 1, wherein the indication is comprised in at least one of a medium access control-control element (MAC-CE) or downlink control information (DCI) indicating a measurement resource periodicity.

8. The apparatus of claim 1, wherein the at least one processor is further configured to:
  transmit at least one of a recommended channel tracking rate or a reference signal periodicity.

9. The apparatus of claim 8, wherein the at least one of the recommended channel tracking rate or the reference signal periodicity is in response to local information at the first device or an occurrence of a layer 1 (L1) event.

10. The apparatus of claim 1, wherein the at least one processor is further configured to:
  transmit, to the second device, one or more updated parameters for the model configuration based on the variation of the wireless channel between the first device and the second device in comparison to the model condition of the wireless channel based on the model configuration.

11. The apparatus of claim 10, wherein the one or more updated parameters includes a compressed delta channel state information (CSI) feedback based on the model configuration.

12. The apparatus of claim 1, further comprising at least one transceiver coupled to the at least one processor and configured to receive the model configuration and the indication of the channel tracking rate.

13. A method of wireless communication at a first device, including:
  receiving a configuration of a periodic resource for a reference signal for measurement of a wireless channel;
  receiving from a second device, a model configuration indicative of a model condition of the wireless channel between the first device and the second device, wherein the model condition indicates a channel state that is modeled based on the model configuration;
  receiving an indication of a channel tracking rate for tracking a variation in the wireless channel relative to the model configuration for the wireless channel;
  measuring, at a timing based on a measurement rate that is based on the configuration for the reference signal and the model configuration, the reference signal from the second device to measure a condition of the wireless channel between the first device and the second device; and
  tracking the variation in the condition measured for the wireless channel relative to the model condition from the model configuration based on the channel tracking rate indicated to the first device.

14. The method of claim 13, wherein the configuration of the periodic resource for the reference signal indicates the measurement rate for the reference signal, and wherein a periodicity of the periodic resource for the reference signal is different than the channel tracking rate indicated in the model configuration.

15. The method of claim 13, wherein the configuration of the periodic resource for the reference signal indicates the measurement rate for the reference signal, and wherein the periodic resource for the reference signal has a same periodicity as the channel tracking rate indicated in the model configuration.

16. The method of claim 13, wherein the channel tracking rate associated with the model configuration is indicated relative to a reference signal resource configuration for the reference signal in additional to a reference signal measurement rate.

17. The method of claim 16, wherein the reference signal resource configuration is for a channel state information (CSI) resource.

18. The method of claim 13, wherein the indication of the channel tracking rate is comprised in the model configuration.

19. The method of claim 13, wherein the indication is comprised in at least one of a medium access control-control element (MAC-CE) or downlink control information (DCI) indicating a measurement resource periodicity.

20. The method of claim 13, further comprising:
transmitting at least one of a recommended channel tracking rate or a reference signal periodicity, wherein the at least one of the recommended channel tracking rate or the reference signal periodicity is transmitted in response to local information at the first device or an occurrence of a layer 1 (L1) event.

21. The method of claim 13, further comprising:
transmitting, to the second device, one or more updated parameters for the model configuration based on the variation of the wireless channel between the first device and the second device in comparison to the model condition of the wireless channel based on the model configuration, wherein the one or more updated parameters includes a compressed delta channel state information (CSI) feedback based on the model configuration.

22. An apparatus for wireless communication at a second device, including:
memory; and
at least one processor coupled to the memory and, based at least in part on information stored in the memory, the at least one processor is configured to:
transmit a configuration of a periodic resource for a reference signal for measurement of a condition of a wireless channel;
transmit a model configuration for a first device, the model configuration being indicative of a model condition of the wireless channel between the first device and the second device, wherein the model condition indicates a channel state that is modeled based on the model configuration;
transmit an indication of a channel tracking rate for tracking a variation in a measured condition of the wireless channel relative to the model condition from the model configuration for the wireless channel; and
receive one or more updated parameters for the model configuration based on the variation between the measured condition of the wireless channel between the first device and the second device and the model condition of the wireless channel based on the model configuration.

23. The apparatus of claim 22, wherein a periodicity of the periodic resource for the reference signal is different than the channel tracking rate indicated in the model configuration; or
wherein the periodic resource for the reference signal has a same periodicity as the channel tracking rate indicated in the model configuration.

24. The apparatus of claim 22, wherein the channel tracking rate associated with the model configuration is indicated relative to a reference signal resource configuration for the reference signal in additional to a reference signal measurement rate, and wherein the reference signal resource configuration is for a channel state information (CSI) resource.

25. The apparatus of claim 22, wherein the indication of the channel tracking rate is comprised in the model configuration or is comprised in at least one of a medium access control-control element (MAC-CE) or downlink control information (DCI) indicating a measurement resource periodicity.

26. The apparatus of claim 22, wherein the at least one processor is further configured to:
obtain at least one of a recommended channel tracking rate or a reference signal periodicity, wherein the at least one of the recommended channel tracking rate or the reference signal periodicity is transmitted in response to local information at the first device or an occurrence of a layer 1 (L1) event.

27. The apparatus of claim 22, wherein the one or more updated parameters includes a compressed delta channel state information (CSI) feedback based on the model configuration.

28. The apparatus of claim 22, further comprising at least one transceiver coupled to the at least one processor and configured to transmit the model configuration and the indication of the channel tracking rate.

29. A method of wireless communication at a second device, including:
transmitting a configuration of a periodic resource for a reference signal for measurement of a condition of a wireless channel;
transmitting a model configuration for a first device, the model configuration being indicative of a model condition of the wireless channel between the first device and the second device, wherein the model condition indicates a channel state that is modeled based on the model configuration;
transmitting an indication of a channel tracking rate for tracking a variation in a measured condition of the wireless channel relative to the model condition from the model configuration for the wireless channel; and
receiving one or more updated parameters for the model configuration based on the variation between the measured condition of the wireless channel between the first device and the second device and the model condition of the wireless channel based on the model configuration.

30. The method of claim 29, wherein a periodicity of the periodic resource for the reference signal is different than the channel tracking rate indicated in the model configuration; or wherein the periodic resource for the reference signal has a same periodicity as the channel tracking rate indicated in the model configuration.

\* \* \* \* \*